(12) United States Patent
Koishi

(10) Patent No.: US 7,400,799 B2
(45) Date of Patent: Jul. 15, 2008

(54) OPTICAL DEVICE AND FABRICATION METHOD AND APPARATUS FOR THE SAME

(75) Inventor: Musubu Koishi, Hamamatsu (JP)

(73) Assignee: Precise Gauges Co., Ltd., Hamamatsu-shi (JP)

( * ) Notice: Subject to any disclaimer, the term of this patent is extended or adjusted under 35 U.S.C. 154(b) by 0 days.

(21) Appl. No.: 11/318,415

(22) Filed: Dec. 22, 2005

(65) Prior Publication Data

US 2006/0140537 A1  Jun. 29, 2006

(30) Foreign Application Priority Data

Dec. 28, 2004  (JP)  ............... 2004-379840

(51) Int. Cl.
  *G02B 6/32*  (2006.01)
(52) U.S. Cl. ............... 385/33; 385/34; 385/96
(58) Field of Classification Search ............ 385/30–43, 385/147, 95–99; 65/377, 387, 406–407, 65/501
  See application file for complete search history.

(56) References Cited

U.S. PATENT DOCUMENTS

| | | | | |
|---|---|---|---|---|
| 3,960,531 A | * | 6/1976 | Kohanzadeh et al. | 65/407 |
| 4,049,414 A | * | 9/1977 | Smith | 65/407 |
| 4,900,114 A | * | 2/1990 | Mortimore et al. | 385/96 |
| 4,962,988 A | * | 10/1990 | Swann | 385/34 |
| 5,560,760 A | * | 10/1996 | Toeppen | 65/407 |
| 2003/0180016 A1 | * | 9/2003 | Yamada et al. | 385/96 |
| 2005/0183460 A1 | * | 8/2005 | Takahara | 65/377 |

FOREIGN PATENT DOCUMENTS

JP    2876857 B2    1/1999

OTHER PUBLICATIONS

M. Ide et al; A Novel Fabrication Method for Fibre Collimators Using a "Shrink-Fit" Splice by Arc Discharge Heating; European Conference on Optical Communication; 2004.
T. Takahara; Assembly Technology for Ultra Microlens Array; The 92$^{nd}$ Microoptics and The 6$^{th}$ System photonics joint meeting; Jul. 2004.

* cited by examiner

*Primary Examiner*—Kevin S Wood
(74) *Attorney, Agent, or Firm*—Frishauf, Holtz, Goodman & Chick, P.C.

(57) ABSTRACT

An optical device fabrication method capable of fabricating optical devices with high precision and reliability in a simple process and at a low cost. The method of splicing a first optical device and a second optical device to fabricate a third optical device includes the steps of: (a) starting heating of an end surface of the first optical device to soften the end surface; (b) pushing the second optical device into the softened end surface to splice the first optical device and a joint surface of the second optical device to each other; (c) pulling back the second optical device to arrange the joint surface of the second optical device onto or outside of the end surface of the first optical device; and (d) terminating heating of the end surface to fix the first and second optical device spliced to each other.

13 Claims, 20 Drawing Sheets

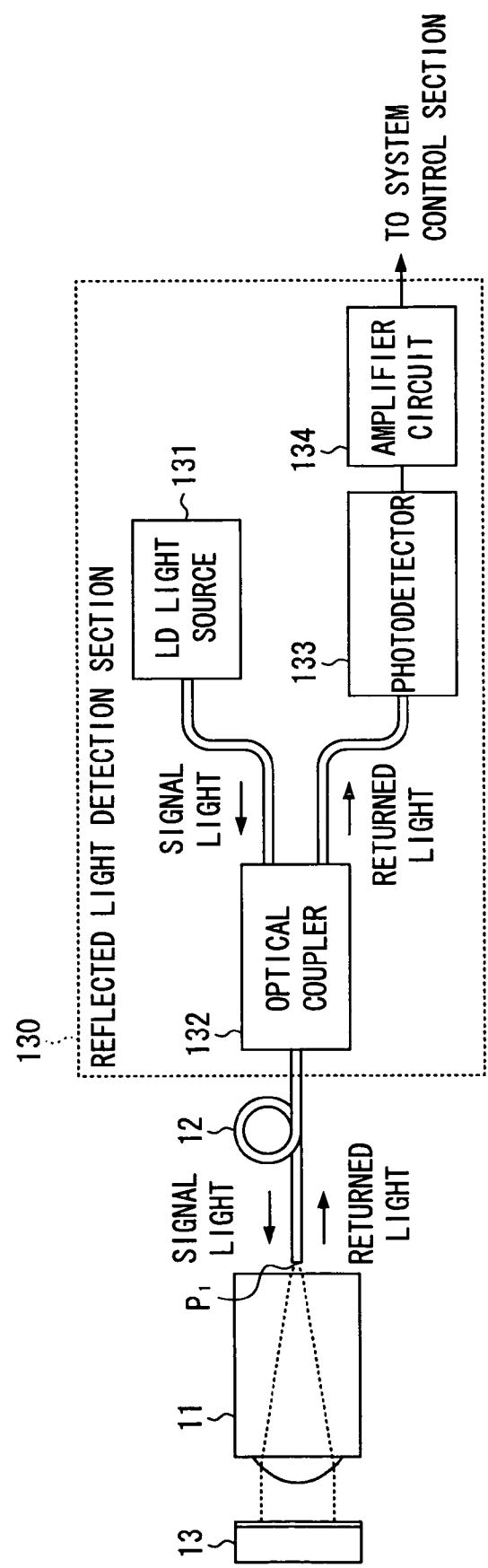

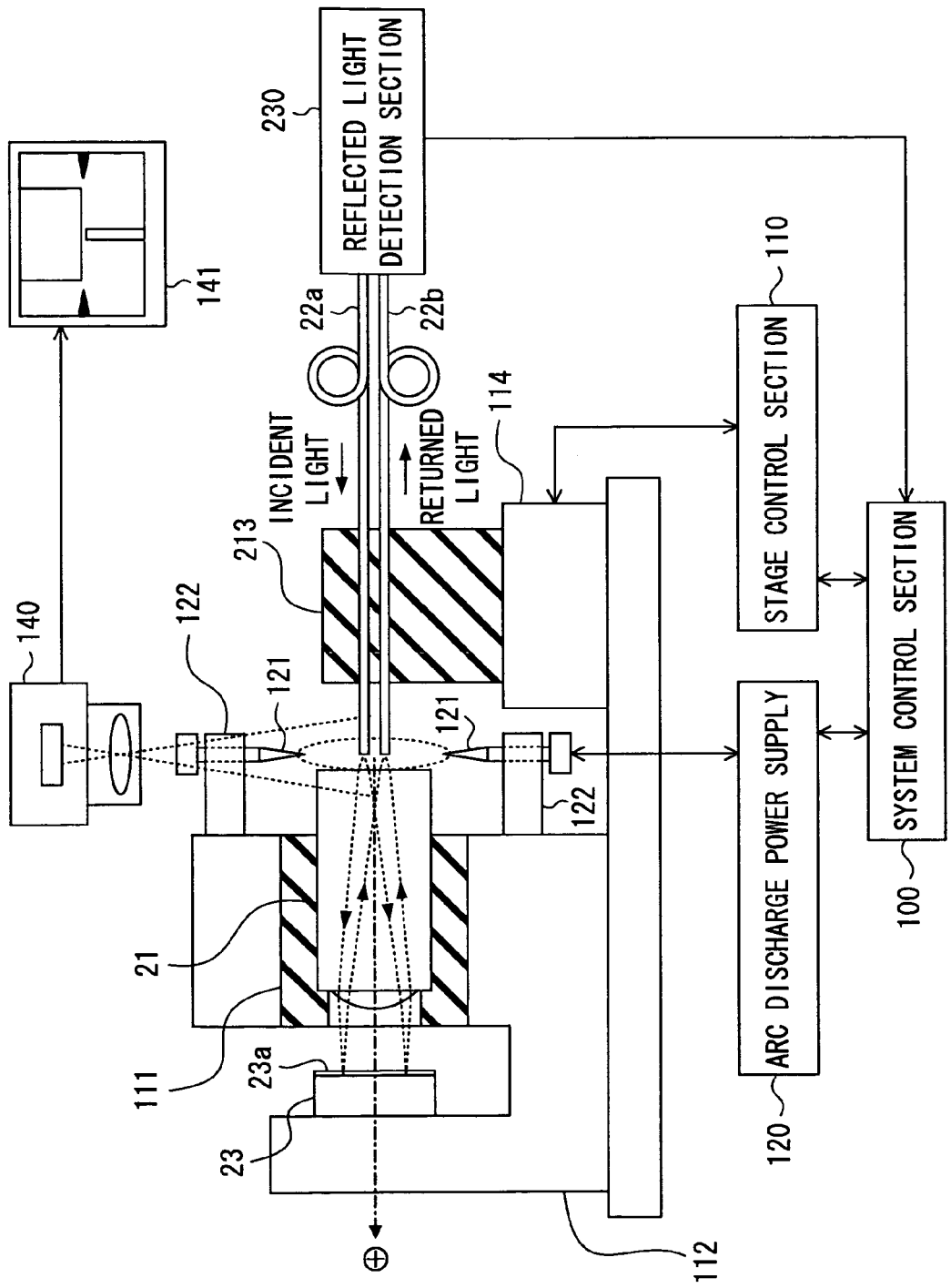

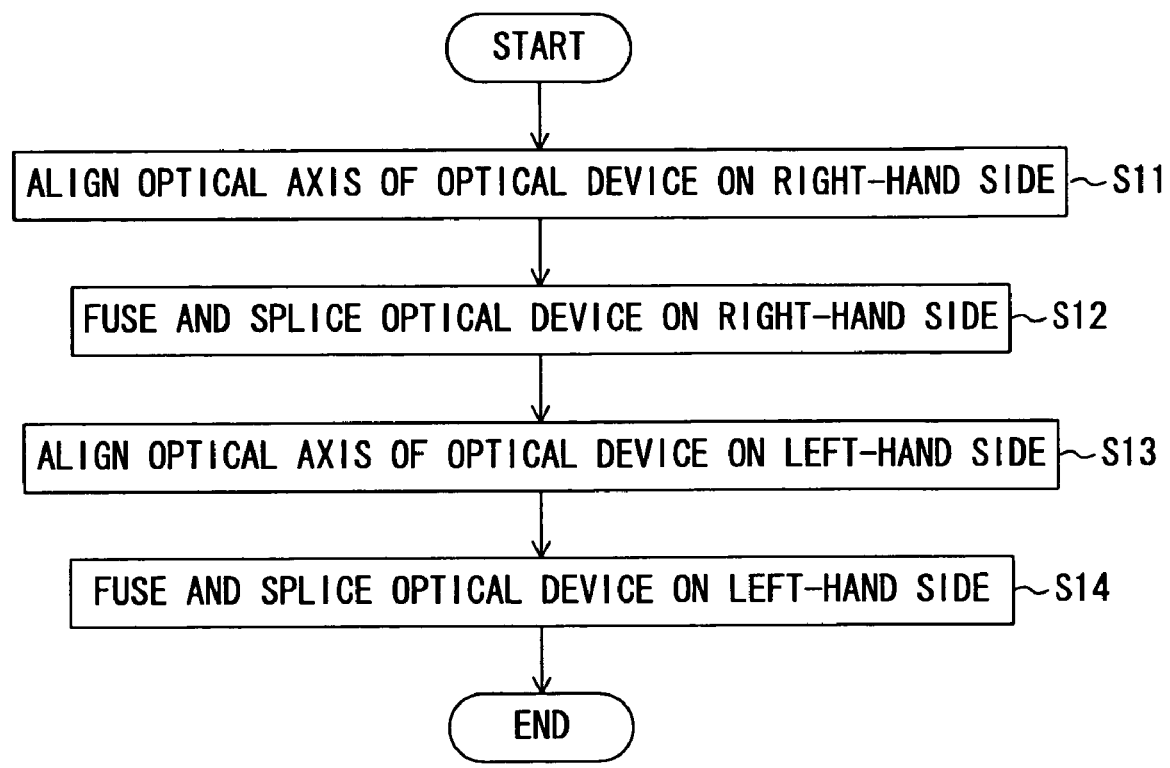

OPTICAL DEVICE AND FABRICATION METHOD AND APPARATUS FOR THE SAME

BACKGROUND OF THE INVENTION

1. Field of the Invention

The present invention relates to an optical device to be used for transmitting light and a fabrication method and an apparatus for such an optical device.

2. Description of a Related Art

FIGS. 17A-17C are diagrams for explaining a conventional fabrication method for fiber collimators. An end surface 901a of an aspheric lens 901 shown in FIG. 17A is flat-polished and coated with an anti-reflective film (AR coat) in order to reduce a reflection loss at a wavelength of light to be transmitted. On the other hand, an optical fiber 902 is inserted into a sleeve called as a capillary 903, which is precisely drilled, and fixed by an adhesive 904 such as resin. An end portion of the optical fiber 902 is cut together with the capillary 903, and an end surface 902a thereof is flat-polished and AR-coated.

When splicing these two devices 901 and 902, as shown in FIG. 17B, an adhesive 905 such as resin is arranged between the end surface 901a of the lens and the end surface 902a of the optical fiber, and optical axis alignment is performed by using a highly reflective mirror 906. That is, the position of the optical fiber 902 on the X-Y plane relative to the lens 901 is adjusted such that light, which is caused to enter the optical fiber 902 and reflected by the highly reflective mirror 906 via the lens 901, returns again to the optical fiber 902 via the lens 901 most efficiently. In such an arrangement, by curing the adhesive 905, a fiber collimator shown in FIG. 17C is completed.

As described above, in the conventional fabrication method for fiber collimators, the number of devices to be used is large and processes required for fabrication are also complicated. Further, since it takes such a long time as several minutes to 30 minutes to cure the adhesive, time for assembly is lengthened and the cost is increased. Furthermore, since a resin adhesive is interposed between the lens and the optical fiber, an optical problem of distortion etc. of a plane of polarization, a problem of deviation of an optical axis that might be caused until the adhesive is cured, and a long-term problem of deterioration of the adhesive and so on arise. Still further, in a lens used in such a fabrication method, a focus F thereof is normally set on the end surface 901a of the lens, and therefore, when light having high power is caused to enter an optical fiber, the light from the lens converges on a minute region at which the adhesive 905 is arranged, resulting in a problem that the spliced portion is easily damaged.

As an optical device not using a resin adhesive, Japanese Patent No. 2876857 (p. 1, FIG. 1) discloses an optical waveguide device in which a fused material, which has a softening temperature lower than that of the material of both the end surface of the optical waveguide and the end surface of the optical fiber, is interposed in the connection plane only within a range of the plane shared by the connection portions of the both end surfaces, and the fused material and the both end surfaces are connected integrally by fusing within the range of the above-mentioned shared plane. In such an optical waveguide device, although the problem caused by interposing a resin adhesive can be avoided, a third member (fused material) is used in addition to the optical waveguide and the optical fiber, and therefore, the fabrication process thereof is also complicated.

Therefore, a technology capable of fabricating an optical device without interposing an adhesive or a fused material is proposed. Ide et al., "A Novel Fabrication Method for Fibre Collimators Using "Shrink-Fit" Splice by Arc Discharge Heating", European Conference on Optical Communication (Proc. ECOC2004), We4.P.020 (2004), discloses a novel fabrication method for fiber collimators, which is capable of directly splicing a single mode fiber and a multi-component glass base lens. Further, Takahara, "Assembly Technology for Ultra Microlens Array", the 92nd microoptics and the 6th system photonics joint meeting (July, 2004), discloses a future prospect of microoptical devices using such a novel fabrication method.

The fabrication method for fiber collimators disclosed in the above-mentioned documents by Ide and Takahara will be explained with reference to FIGS. 18A-18C. In the fabrication method for fiber collimators, a low melting point glass lens and a quartz optical fiber are used as devices.

First, as shown in FIG. 18A, optical axis alignment of a core 912b of an optical fiber 912 is performed with respect to a lens 911. To this end, a highly reflective mirror 913 is arranged ahead of the lens 911 (on the left-hand side in the drawing) and perpendicular to the optical axis of the lens 911, and at the same time, an end surface 912a of the optical fiber 912 is brought about 5 μm close to a rear end surface (on the right-hand side in the drawing) 911a of the lens 911. Then, light is caused to enter the optical fiber 912 and the intensity of the returned light is detected, which light has been reflected by the highly reflective mirror 913 via the lens 911 and has again entered the optical fiber 912 via the lens 911. While monitoring the intensity of the returned light, the end surface 912a of the optical fiber 912 is moved in the X-Y plane and the position of the end surface 912a of the optical fiber 912 is determined such that the returned light is strongest.

Next, as shown in FIG. 18B, an arc electrode 914 is arranged in the vicinity of the end surface 911a of the lens 911 and by causing an arc discharge to occur to generate a thermal plasma, the end portion of the lens 911 including the rear end surface 911a is softened. Then, as shown in FIG. 18C, the optical fiber 912 is pushed in to a focus F present at a depth of about 5 μm to 20 μm from the end surface 911a of the softened lens 911. The optical fiber 912 is fixed by keeping this arrangement and terminating the arc discharge to allow the lens 911 to cool down spontaneously.

According to such a fabrication method for fiber collimators, no capillary is necessary and processes such as polishing of the surface to be spliced and formation of an AR coat are not necessary, and therefore, the cost can be reduced. Further, there is an advantage that the assembly time can be reduced to about a few seconds because fused-splicing is performed by using arc discharges. Furthermore, since an adhesive such as resin is not used, it is possible to avoid problems such as distortion of a plane of polarization caused by adhesive, deviation in position between a lens and an optical fiber, and deterioration of adhesive and damages to adhesive when light having high power enters in a long term.

However, there arises another problem as follows in a fabrication method for fiber collimators by using the fused-splicing.

Firstly, as shown in FIG. 19, if spontaneously cooling down is allowed in the arrangement in which the optical fiber 912 is pushed into the softened lens 911, a compression stress is applied to the portion into which the optical fiber 912 is pushed due to the contraction of the glass. Accordingly, crack is introduced in the optical fiber 912 and the optical fiber breaks at its root.

Secondly, in a lens to be used in such a fabrication method, the focus F is normally positioned inside the lens 911 in which the end surface 912a of the optical fiber 912 is arranged. In other words, as shown in FIG. 18A, on the X-Y plane on which the end surface 912a of the optical fiber 912 is arranged at the time of optical axis alignment, the focus of the lens 911 does not exist. Because of this, optical axis alignment is performed based on the returned light in a blurred state (that is, an arrangement in which the center peak of the intensity is broadened), and therefore, the precision in detecting the center of the X-axis and Y-axis is deteriorated. Further, since it is not possible to confirm the position of the focus F existing inside the lens before fused-splicing, it is difficult to precisely match the end surface 912a to the focus F when pushing the optical fiber 912 into the lens 911. Therefore, the precision about Z-axis is also deteriorated.

Thirdly, as shown in FIG. 20A, in the case of fabricating a fiber collimator by employing an optical fiber having a front end which is cut obliquely, when an optical fiber 922 is pushed into a lens 921, an inclined end surface 922a of the optical fiber 922 receives a reaction force in the direction perpendicular to the end surface 922a from the softened glass. As a result, as shown in FIG. 20B, the front end portion of the fiber 922 is fixed at a deferent position deviated from the position at which optical axis alignment is performed. Therefore, there also arises a problem that optical devices having high precision cannot be fabricated.

SUMMARY OF THE INVENTION

The present invention has been achieved in view of the above-described problems. An object of the present invention is to provide an optical device fabrication method and an optical device fabrication apparatus capable of fabricating optical devices with high precision and reliability in a simple process and at a low cost, and an optical device fabricated by using such a fabrication method.

In order to solve the above-described problems, an optical device fabrication method according to one aspect of the present invention is a method of splicing a first optical device and at least one second optical device to fabricate a third optical device, and includes the steps of: (a) starting heating of an end surface of the first optical device to soften the end surface; (b) pushing the at least one second optical device into the softened end surface of the first optical device by a predetermined amount to splice the first optical device and a joint surface of the at least one second optical device to each other; (c) pulling back the at least one second optical device to a predetermined position to arrange the joint surface of the at least one second optical device onto or outside of the end surface of the first optical device; and (d) terminating heating of the end surface of the first optical device to fix the first optical device and the at least one second optical device spliced to each other.

Moreover, an optical device fabrication apparatus according to one aspect of the present invention is an apparatus for splicing a first optical device and at least one second optical device to fabricate a third optical device, and includes: first holding means for holding the first optical device; second holding means for holding the at least one second optical device; heating means for heating an end surface of the first optical device; position adjusting means for mounting and carrying at least one of the first holding means and the second holding means to arrange the at least one second optical device at a predetermined position relative to the first optical device; and a control means for controlling at least the position adjusting means to push the at least one second optical device into the end surface of the first optical device, which is softened by being heated by the heating means, by a predetermined amount to splice the first optical device and a joint surface of the at least one second optical device to each other, and then, to pull back the at least one second optical device to a predetermined position to arrange the joint surface of the at least one second optical device onto or outside of the end surface of the first optical device.

Furthermore, an optical device according to one aspect of the present invention includes: a first optical device having an end surface formed of glass or quartz; and at least one second optical device formed of glass or quartz, and the at least one second optical device is spliced to the first optical device by being pushed into the end surface of the first optical device softened by being heated, and then, pulled back in the direction opposite to the direction of being pushed.

According to the present invention, the first optical device and the second optical device are spliced by fused-splicing, and therefore, a capillary for supporting an optical fiber and processes such as polishing of the splicing surfaces of the two optical devices and AR coating are no longer necessary. Consequently, a fabrication process is made simple and the fabrication cost can be reduced. Further, no adhesive is arranged on the joint surfaces of the first optical device and the second optical device, and therefore, it is possible to firmly splice the two optical devices without causing optical distortion such as distortion of a plane of polarization to occur. In particular, almost no air-containing layer exists between the joint surfaces of the two optical devices and the effect that stain and dust attached to the joint surfaces are removed can be expected by thermal plasma caused to occur when the splicing surface is softened, and therefore, a propagation loss of light at the joint surface and the like can be reduced. Furthermore, misalignment of the optical axis on the spliced surface caused due to the use of adhesive and temporal deterioration of the resin material of adhesive do not occur, and therefore, the reliability of the product can be improved and it is made possible to propagate light having high power through an optical fiber.

In addition, according to the present invention, the second optical device is pulled back after the second optical device is pushed into the first optical device, and therefore, it is possible to avoid the problem that the second optical device receives stress distortion and is damaged due to the contraction of the first optical device that has cooled down spontaneously. At that time, by using as the first optical device an optical device having a focus existing outside the end surface to which the second optical device is to be spliced, it is possible to accurately perform optical axis alignment of the first optical device and the second optical device, and it is possible to calculate the final splicing position of the second optical device relative to the first optical device based on the actually measured values. Accordingly, it is made possible to improve the precision of the third optical device. Further, even in the case where the front end of the second optical device misaligns from the optical axis due to the reaction force produced when the second optical device is pushed into the first optical device, the misalignment can be corrected by pulling back the second optical device.

BRIEF DESCRIPTION OF THE DRAWINGS

FIG. 5 is a diagram for explanation of a configuration of a reflected light detection section shown in FIG. 1.

FIG. 8 is a schematic diagram showing a configuration of an optical device fabrication apparatus according to a second embodiment of the present invention.

FIG. 12 is a flow chart showing an operation of the optical device fabrication apparatus according to the third embodiment of the present invention.

DESCRIPTION OF THE PREFERRED EMBODIMENTS

Embodiments of the present invention are described below in detail with reference to the drawings. Note that the same reference numbers are attached to the same components and explanation thereof is omitted. In the following description, a "low melting point glass" means a glass having a glass transition point (softening point) not larger than 600° C. or 700° C., and a "high melting point glass" means a glass having a glass transition point higher than that temperature.

Figure 1:
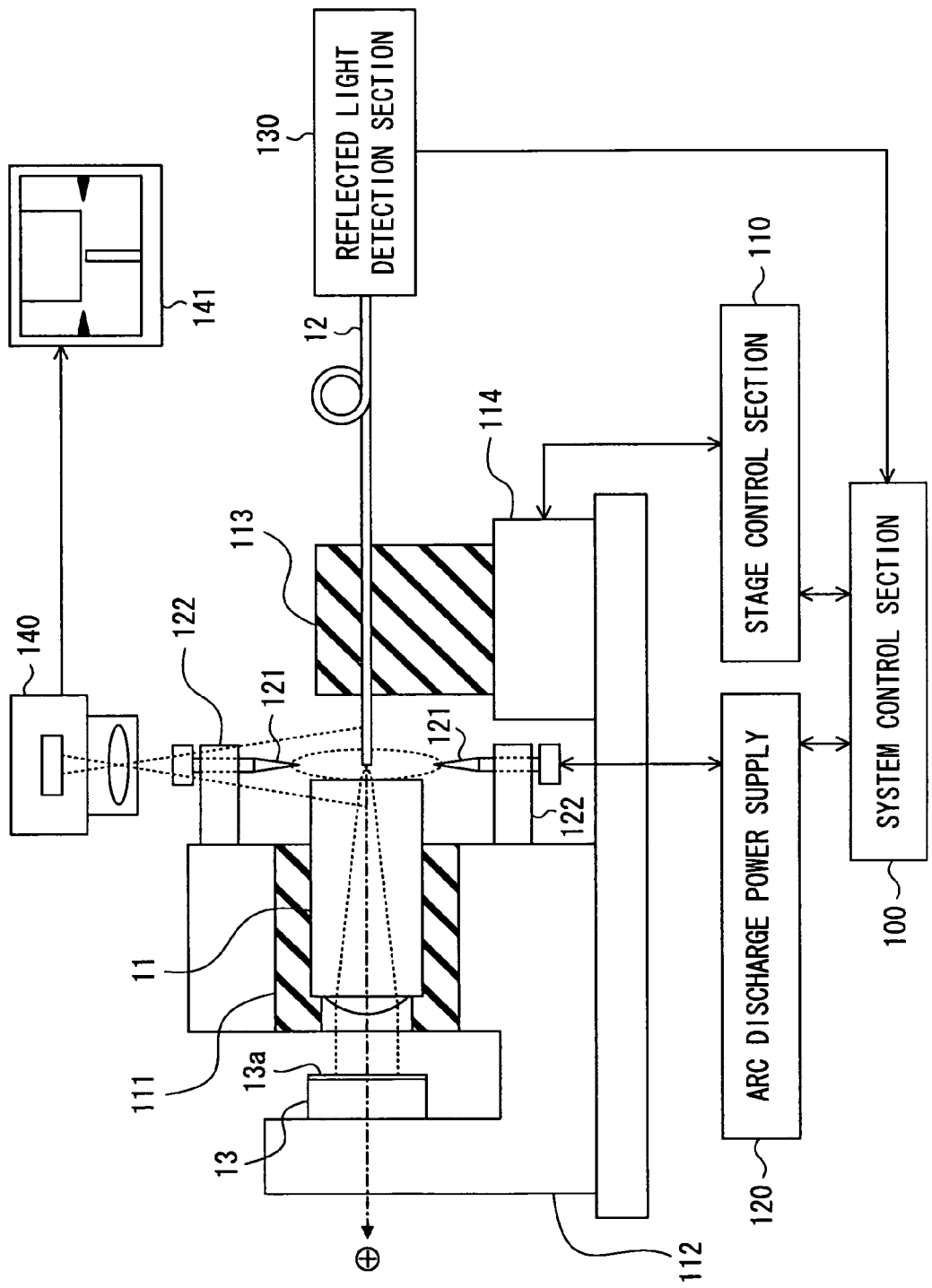
FIG. 1 is a schematic diagram showing a configuration of an optical device fabrication apparatus according to a first embodiment of the present invention.

FIG. 1 is a schematic diagram showing a configuration of an optical device fabrication apparatus according to a first embodiment of the present invention. The optical device fabrication apparatus is an apparatus for splicing a first optical device and a second optical device to fabricate a third optical device. In the present embodiment, a lens is used as the first optical device and an optical fiber is used as the second optical device, and thus a fiber collimator is fabricated.

The optical device fabrication apparatus shown in FIG. 1 includes a system control section 100, a stage control section 110, an arc discharge power supply 120, a reflected light detection section 130, a lens holder 111, a holder 112, a fiber holder 113, a movable stage 114, an arc electrode 121, and an arc electrode holder 122. Further, the optical device fabrication apparatus according to the present embodiment may also include a position observation section 140 and a monitor 141.

The system control section 100 controls the operation of the entire optical device fabrication apparatus shown in FIG. 1, that is, a series of fusing and splicing procedures for fabricating optical devices.

The lens holder 111 is a jig for holding a lens 11 to be processed. A precisely worked groove such as V-groove or U-groove is formed on the lens holder 111 in order to fix the lens 11 parallel to the optical axis. Since the lens holder 111 is arranged near the arc electrode 121, the lens holder 111 is fabricated of an insulating material such as ceramic.

The holder 112 together with the lens holder 111 hold the lens 11 and the holder 112 also holds a highly reflective mirror 13 used at the time of optical axis alignment of an optical fiber 12 to be spliced to the lens 11.

By reflecting light emitted from the lens 11, the highly reflective mirror 13 causes the light to enter the lens 11 again. The highly reflective mirror 13 is fixed by the holder 112 strictly perpendicular to the axis direction of the lens holder 111. In the present embodiment, an aspheric lens is used as the lens 11, and therefore, a mirror surface 13a is preferable to be set at a position at which the beam waist of light collimated and emitted from the lens 11 is slimmest, that is, a position apart from the front end of the lens 11 by an average focus distance.

The fiber holder 113 holds the optical fiber 12 to be spliced to the lens 11.

The movable stage 114 is position adjusting means for adjusting the position of the optical fiber 12 held by the fiber holder 113 by mounting and carrying the fiber holder 113. The movable stage 114 moves three-dimensionally under the control of the stage control section 110. Alternatively, an operator may operate the movable stage 114 manually. In the present embodiment, the relative position of the fiber 12 to the lens 11 is aligned by moving the fiber holder 113, however, the relative positions of both may also be aligned by moving the lens holder 111 side or both the lens holder 111 and the holder 113.

The stage control section 110 controls the operation of the movable stage 114 under the control of the system control section 100.

The arc electrode 121 is composed of a pair of plus and minus electrodes and causes an arc discharge to occur by being supplied with power from the arc discharge power supply 120 that operates under the control of the system control section 100. The timing of the arc discharge and the strength of the discharge are controlled by the system control section 100. The arc electrode holder 122 is a jig for fixing the respective arc electrodes 121.

The reflected light detection section 130 causes light used at the time of optical axis alignment to enter the optical fiber 12 and at the same time, detects the intensity of the light returned from the optical fiber 12. The configuration of the reflected light detection section 130 will be described later in detail.

The position observation section 140 is an image pick-up device for observing the spliced portion of the lens 11 and the optical fiber 12. The monitor 141 displays an image picked up by the position observation section 140.

Next, an optical device fabrication method according to the first embodiment of the present invention will be described with reference to FIGS. 1-5. In the following description, it is assumed that the optical axis of the lens 11 is the Z-axis. Further, it is also assumed that the direction toward the left-hand side in the drawing is the plus direction (front direction) and the direction toward the right-hand side in the drawing is the minus direction (rear direction) on the Z-axis.

In the present embodiment, the lens 11 (FIG. 1) used as a process object on one side is formed of a low melting point glass having a softening point of about 600° C. The lens 11 is an aspheric glass mold lens having an average focus distance of about 1.3 mm, a diameter of about 1.0 mmφ, and a lens length of about 2 mm, and is designed such that the focus is formed at a position apart from a rear end surface 11a of the lens by not less than 5 μm.

Figure 2A:
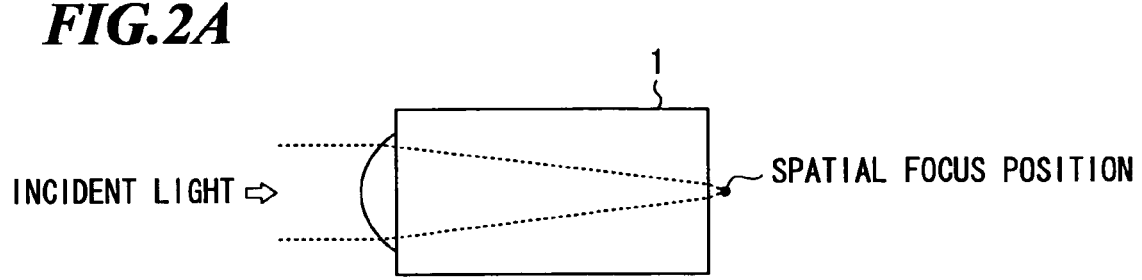
FIGS. 2A and 2B are diagrams for explanation of a spatial focus distance and an optical focus distance.
Figure 2B:
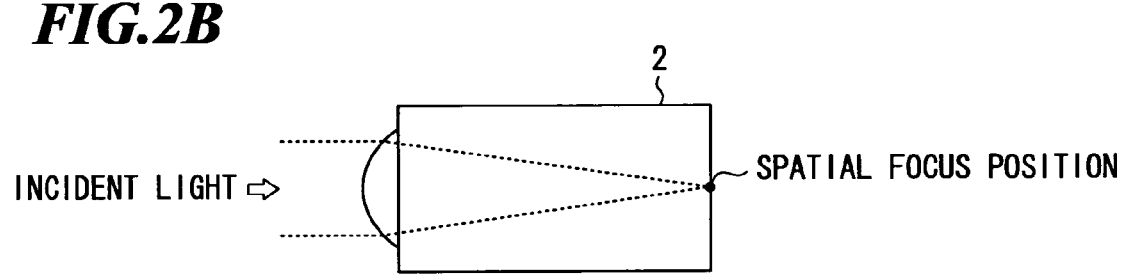

Here, in the present application, when the lens is designed such that the focus of the lens is formed outside the lens as shown in FIG. 2A, the position of the focus is referred to as a spatial focus position. The spatial focus position varies in accordance with the refractive index of a medium (for example, air or quartz of an optical fiber) interposed between the lens and the focus. On the other hand, when the focus of the lens is formed on the end surface of or inside the lens as shown in FIG. 2B, the position of the focus is referred to as an optical focus position.

Further, in the present embodiment, the optical fiber 12 (FIG. 1) used as a process object on the other side is formed of quartz having a softening point of about 1,800° C. The optical fiber 12 is a single core and single mode optical fiber having a clad diameter of about 125 μm, and the end surface thereof is cut perpendicularly. As the optical fiber 12, in addition to this, one formed of a high melting point glass may also be used or any one of a multimode optical fiber, a polarization holding fiber and a photonic crystal fiber may also be used.

Figure 3:
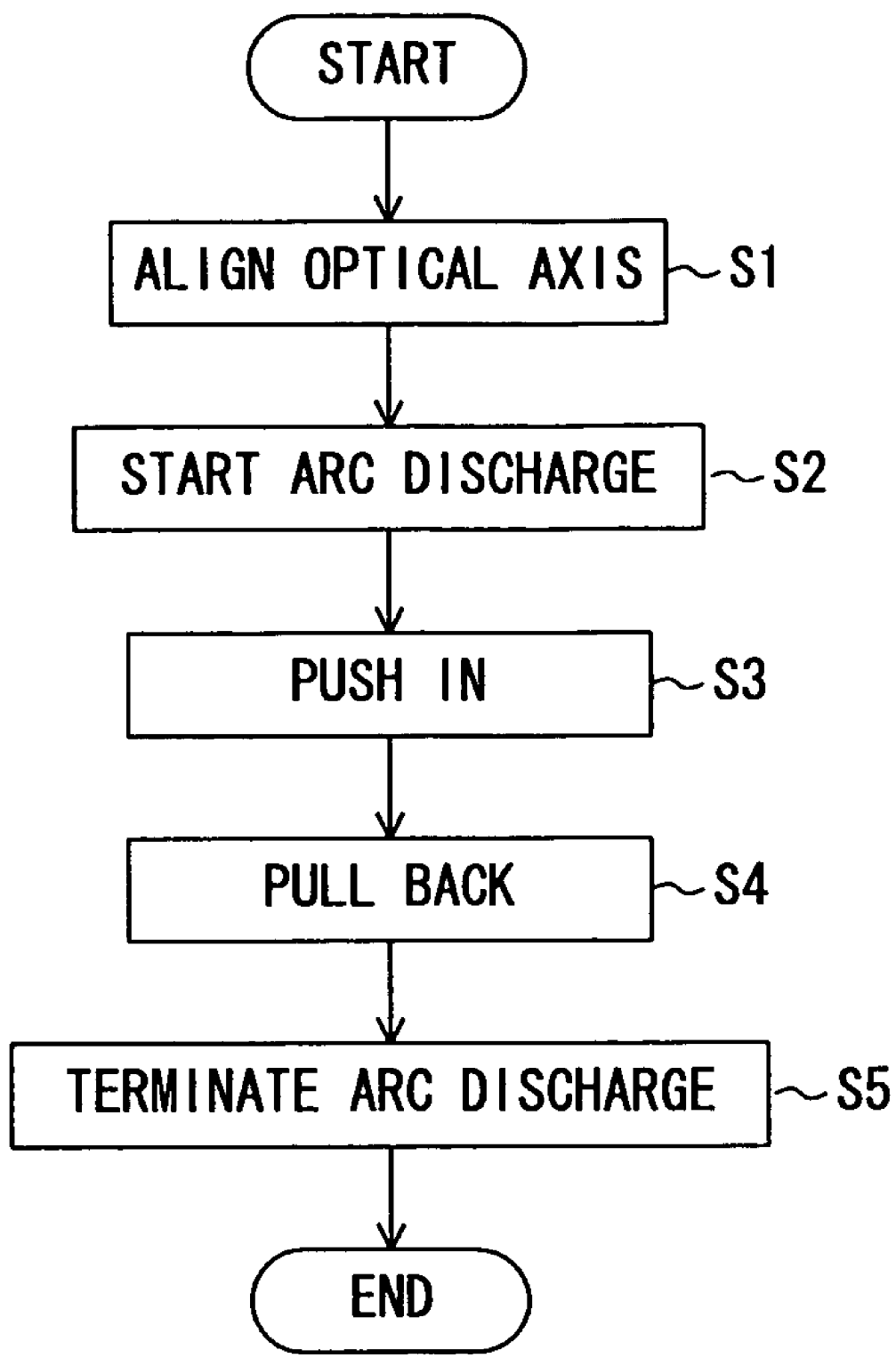
FIG. 3 is a flow chart showing an operation of an optical device fabrication apparatus according to the first to third embodiments of the present invention.

FIG. 3 is a flow chart showing the operation of the optical device fabrication apparatus shown in FIG. 1. FIGS. 4A-4D are diagrams for explanation of the optical device fabrication apparatus according to the present embodiment.

First, as a preparation before the operation of the optical device fabrication apparatus, as shown in FIG. 1, the lens 11 is set to the lens holder 111, and the optical fiber 12 is set to the fiber holder 113. Then, a coarse alignment is performed by moving the movable stage 114 such that the distance between the rear end surface 11a of the lens 11 and a front end surface 12a of the optical fiber 12 is about 5 μm to about 20 μm and the optical fiber 12 is arranged near the center of the optical axis of the lens. An operator may perform this coarse alignment manually while watching an image on the monitor 141 picked up by the position observation section 141 or it may also be performed automatically under the control of the control section 100.

Figure 4A:
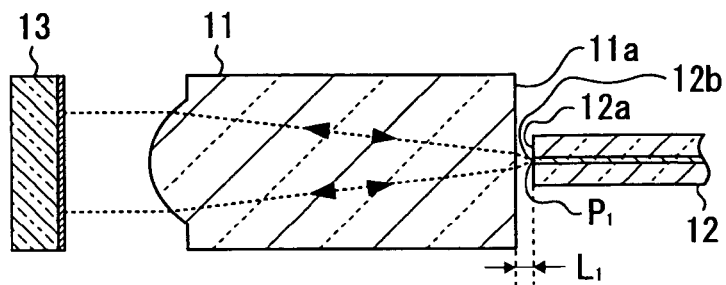
FIGS. 4A-4D are diagrams for explanation of an optical device fabrication method according to the first embodiment of the present invention.

At step S1 in FIG. 3, optical axis alignment of the lens 11 and the optical fiber 12 is performed as shown in FIG. 4A.

FIG. 5 is a diagram for explanation of a configuration of the reflected light detection section 130 used when fabricating single core fiber collimators. The reflected light detection section 130 includes a laser diode (LD) light source 131, an optical coupler 132, a photodetector 133 and an amplifier circuit 134. Light (signal light) emitted from the LD light source 131 passes through the optical coupler 132 to enter one end of the optical fiber 12 and goes out from the other end of the optical fiber 12 to enter the lens 11. This light is collimated by the lens 11 and emitted from the lens 11, reflected by the highly reflective mirror 13, returns to the lens 11 again, and enters the optical fiber 12. Further, this light (returned light) enters the optical coupler 132 through the optical fiber 12 and is guided to the photodetector 133. The photodetector 133 detects the intensity of the returned light and the detected signal output from the photodetector 133 is amplified in the amplifier circuit 134 and output to the system control section 100 (FIG. 1).

The system control section 100 shown in FIG. 1 controls the stage control section 110 to scan the movable stage 114 three-dimensionally, based on the detected signal output from the reflected light detection section 130. Due to this, the position of the front end surface 12a of the optical fiber 12 on the X-axis, Y-axis and Z-axis is determined such that the intensity of the returned light becomes strongest. By such optical axis alignment, as shown in FIG. 4A, a center position 12b of the core on the front end surface 12a of the optical fiber 12 (hereinafter, referred to as a "front end core center position") is arranged at a spatial focus position $P_1$ of the lens 11.

In addition, in order to determine an amount of pushing-in of the optical fiber 12 in a later process, the distance between the rear end surface 11a of the lens 11 and the front end core center position 12b of the optical fiber 12 is measured. This distance may be measured by any known method. For example, the measurement may be performed based on images picked up by using an image pick-up device such as a CCD camera, or the distance may be measured by irradiating the sides of the lens 11 and the optical fiber 12 with collimated light such as laser, or the distance may be measured by using a contact sensor, an optical sensor or the like, by moving the optical fiber 12 from the spatial focus position $P_1$ to the rear end surface 11a of the lens 11.

Figure 4B:
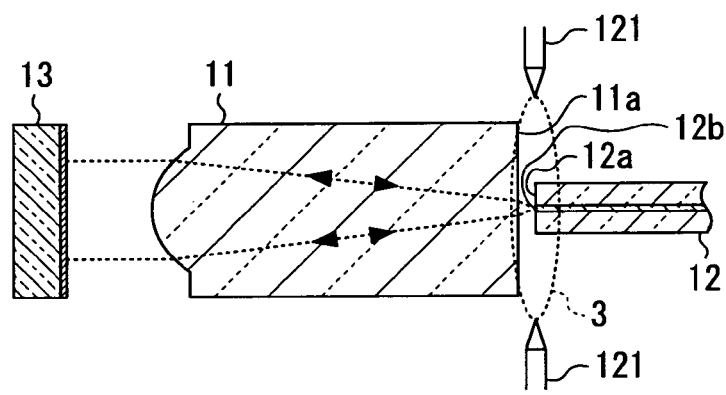

Next, at step S2, as shown in FIG. 4B, a discharge plasma 3 is generated by starting an arc discharge under the control of the system control section 100. Due to this, a region including the rear end surface 11a of the lens 11 is heated and softened. At this time, the front end portion of the optical fiber 12 is also exposed to the discharge plasma 3, and therefore, the front end surface 12a is heated in such an extent that it is not deformed.

Figure 4C:
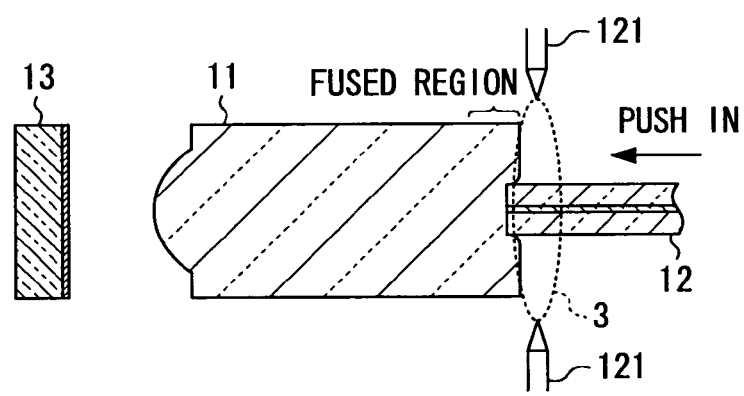

When a predetermined time elapses after arc discharges are started, at step S3, as shown in FIG. 4C, the front end portion of the optical fiber 12 is pushed into the rear end surface 11a of the lens 11 by moving the movable stage 114 in the direction of the plus Z-axis by a predetermined amount. Due to this, the softened glass portion of the lens 11 and the front end portion of the heated optical fiber 12 are fused and spliced to each other at the boundary surface.

Figure 6A:
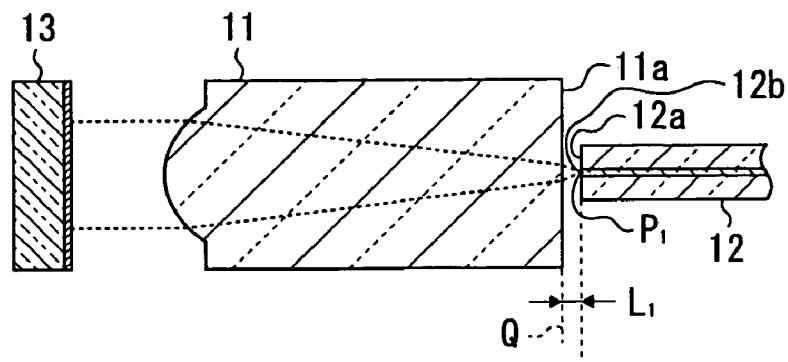
FIGS. 6A-6C are diagrams for explanation of an amount of movement of an optical fiber (a movable stage).
Figure 6B:
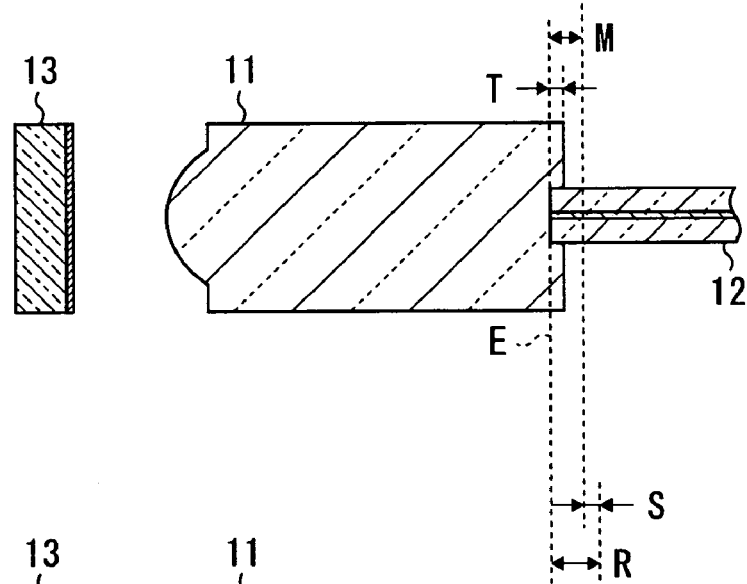

An amount of movement M of the front end surface 12a of the optical fiber 12 at step S3 becomes an amount of about 6 μm to about 40 μm, which is the sum of a distance $L_1$ (about 5 μm to about 20 μm) between the lens 11 and the optical fiber 12 shown in FIG. 6A and an amount of pushing-in T (about 1 μm to about 20 μm) shown in FIG. 6B. That is, $M=(L_1+T)$. Moreover, it is preferable that the moving speed of the movable stage 114 be set to, for example, about 5 μm/second to about 50 μm/second. Furthermore, in order to enhance the effect of fused-splicing, minute vibrations having an amplitude of about a few micrometers may be applied to at least one of the optical fiber 12 side and the lens 11 side by using a piezo actuator, etc. when the optical fiber 12 is pushed into the lens 11.

Figure 4D:
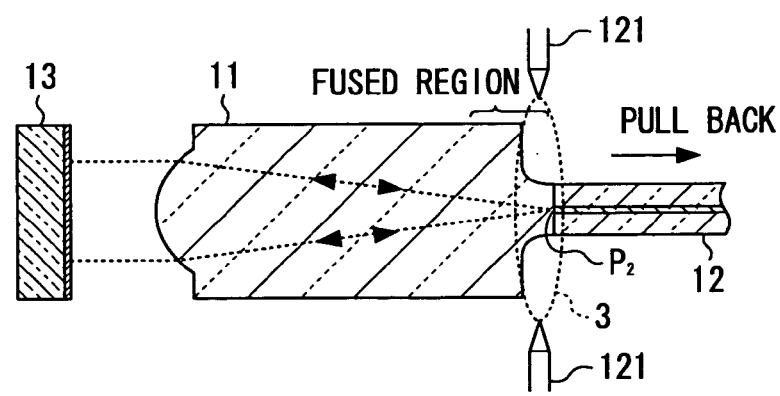

Next, at step S4, as shown in FIG. 4D, the optical fiber 12 is pulled back from the lens 11 by moving the movable stage 114 by a predetermined amount in the direction of the minus Z-axis. Due to this, the front end surface 12a of the optical fiber is pulled back onto at least the rear end surface 11a or outside of the outside of the rear end surface 11a, and is finally positioned at an optical focus distance $P_2$ of the lens 11. At that time, the front end portion of the optical fiber 12 and the glass member of the lens 11 fused and spliced to each other are firmly in close contact to each other, and therefore, the softened glass member is also pulled out to the outside of the rear end surface 11a while keeping an arrangement of being fused and spliced to the optical fiber 12.

Figure 6C:
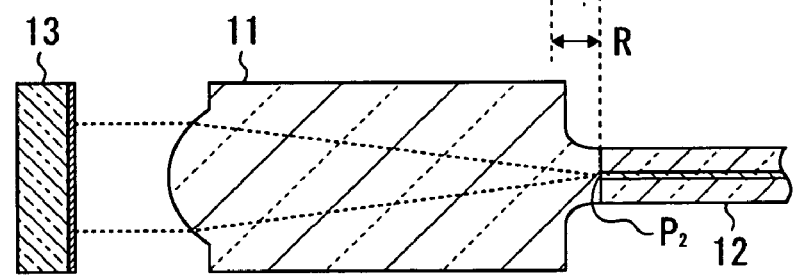

As shown in FIG. 6C, an amount of pulling-back R of the optical fiber 12 is calculated by using the following expression (1). In the expression (1), $n_1$ represents a refractive index of the lens 11 at a wavelength used by an optical device and $n_2$ represents a refractive index of air or vacuum.

$$R=M+L_1\times\{(n_1/n_2)-1\} \quad (1)$$

When the spatial focus position $P_1$ of the lens 11 is used as a reference, an amount of pulling-back S is calculated using the following expression (2).

$$S=L_1\times\{(n_1/n_2)-1\} \quad (2)$$

In order to further stabilize an arrangement of being fused and spliced after pulling-back as well as to remove the influence of the backlash in the Z-axis, the movable stage 114 may be once moved in the direction of the minus Z-axis by an amount exceeding the amount of the pulling-back R or the amount of pulling-back M, and thereafter moved in the opposite direction (in the direction of the plus Z-axis) such that it is finally moved by the amount as described above.

According to the experiment conducted by the inventor of the present invention, when the lens is heated by arc discharges in such an extent that it is not deformed remarkably, it is possible to pull out the optical fiber 12 from the rear end surface of the lens by a distance of about 30 μm.

Next, at step S5, the arc discharge is terminated and the lens 11 and the optical fiber 12 are allowed to cool down spontaneously while maintaining an arrangement in which the optical fiber 12 is pulled back from the rear end surface 11a of the lens 11. Due to this, the lens 11 and the optical fiber 12 fused and spliced to each other are fixed and a fiber collimator is completed.

The reason why a lens designed to have a focus formed outside the lens is used as one of devices for fabricating a fiber collimator in the present embodiment is described below.

In the case where the focus of a lens exists at the inside thereof, at any position outside the lens where optical axis alignment can be performed, the center peak in the intensity distribution of returned light is broadened. Accordingly, optical axis alignment is performed based on the blurred returned light, and it is difficult to obtain high precision. Further, it is not possible to accurately confirm the end surface (incident end) of the optical fiber with respect to the focus position of the lens to be matched therewith before pushing the optical fiber into the lens, and therefore, the amount of pushing-in is determined based on the designed amount of the lens.

However, as in the present embodiment, in the case where the focus of the lens exists outside the lens, a position, in which the center peak in the intensity distribution of the returned light is sharp, exists outside the lens, and therefore, it is possible to perform optical axis alignment with high precision. Further, it is possible to actually measure the focus position (spatial focus position) of the lens before fused-splicing, and therefore, it is possible to determine a position, at which the lens and the incident end of the optical fiber to be fused and spliced are matched to each other, based on the actually measured value. Accordingly, it is possible to fabricate optical devices having high precision corresponding to individual devices (lenses).

It is preferable that actual optical dimensions of the lens be designed such that the spatial focus position is apart from the rear end surface of the lens by at least 3 μm. The purposes of this are to prevent the lens from coming into contact with the optical fiber at a step at which optical axis alignment of the optical fiber is performed on the movable stage in the case where the core of the optical fiber is a transmission and reception optical end surface, and to improve heating efficiency by causing the discharge plasma to penetrate between the lens and the fiber when the lens is heated by arc discharges.

Figure 7A:
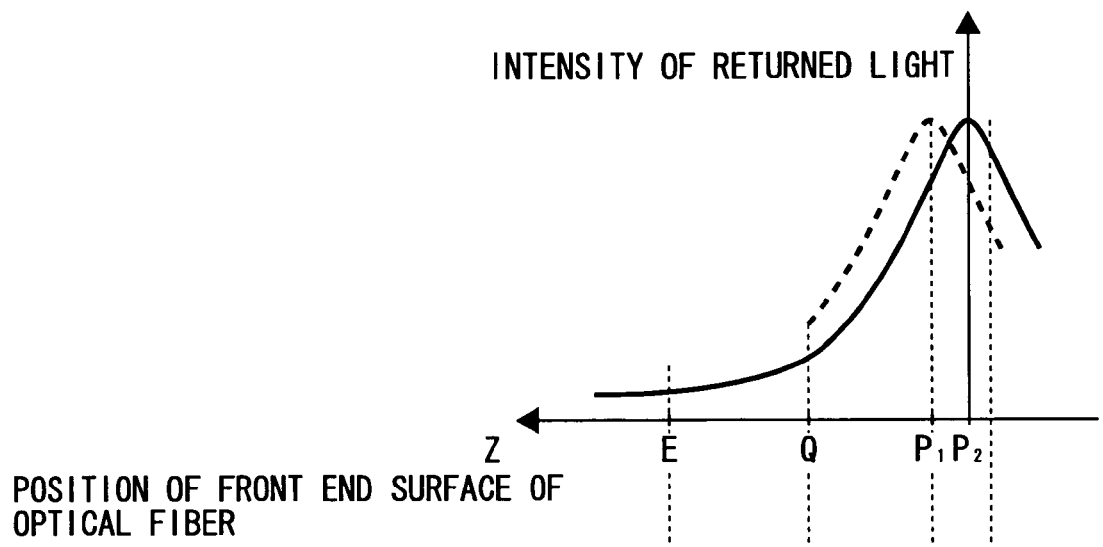
FIGS. 7A and 7B are diagrams showing a relationship among the front end position of the optical fiber and the intensity of returned light and the amount of movement of the optical fiber.
Figure 7B:
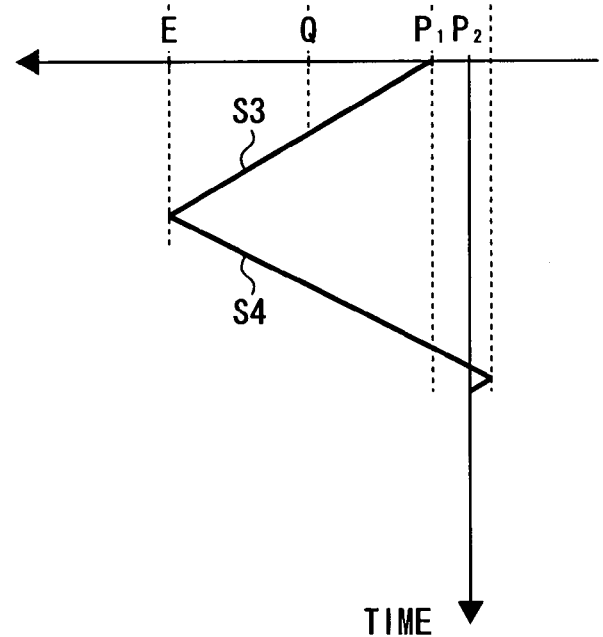

Further, in the present embodiment, at step S4, the movable stage 114 is caused to move based on the value calculated on the distance $L_1$ between the rear end surface 11a of the lens 11 and the front end surface 12a of the optical fiber 12, however, the operation of the movable stage 114 may also be controlled based on the intensity of the returned light detected by the reflected light detection section 130 shown in FIGS. 1 and 5. As shown in FIG. 7A, the intensity of the returned light is strongest when the incident end of the optical fiber is at the spatial focus position of the lens (the curved line shown by the broken line) or at the optical focus distance of the lens (the curved line shown by the solid line). Therefore, the final position on the Z-axis, to which the core of the front end surface of the optical fiber should be matched, is determined while monitoring the detection signal of the returned light in real time. Specifically, as shown in FIGS. 6A and 6B, the optical fiber 12 is pushed into the depth Z=E from the rear end surface 11a (Z=Q) of the lens 11, and subsequently, the optical fiber is pulled back. Then, after the incident end of the optical fiber passes the optical focus distance $P_2$ and the intensity of the returned light begins to decrease, the optical fiber 12 is pushed back to the position at which the returned light shows the maximum value, that is, the optical focus position (FIG. 6C). In this method, the movable stage may also be controlled with reference to the amount of pulling-back R or S calculated by the expression (1) or (2), or the movable stage may also be controlled based only on the detection signal of the returned light.

In the first embodiment of the present invention described above, a fiber collimator is fabricated by employing a lens and an optical fiber having a front end cut perpendicularly (a perpendicularly-cut optical fiber), however, an optical fiber having a front end cut obliquely (an obliquely-cut optical fiber) may also be used. In the case where the front end of an optical fiber is cut perpendicularly, a relatively large reflection loss is produced at the spliced surface due to the difference in the refractive index between the lens material and the optical fiber material. When a lens formed of a general low melting point glass is used, the magnitude of the reflection loss is about minus 32 dB. Therefore, if it is necessary to suppress the reflection loss within about minus 60 dB in accordance with the usage of the fiber collimator, it is preferable to use an obliquely-cut fiber.

Figure 20A:
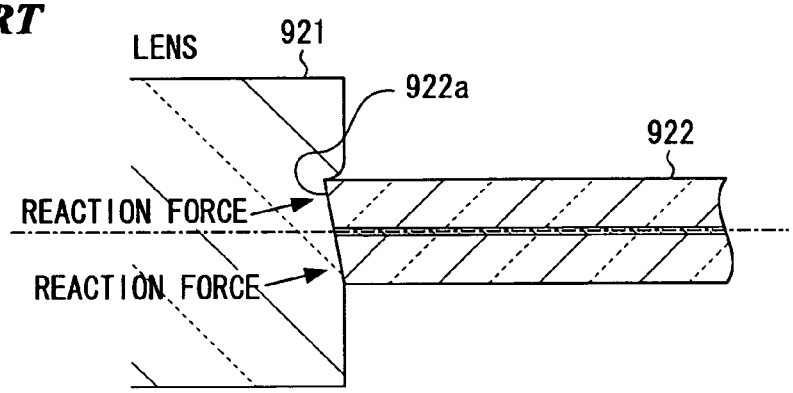
FIGS. 20A and 20B are diagrams showing an arrangement in which an optical fiber the front end of which is cut obliquely is pushed into a softened glass.
Figure 20B:
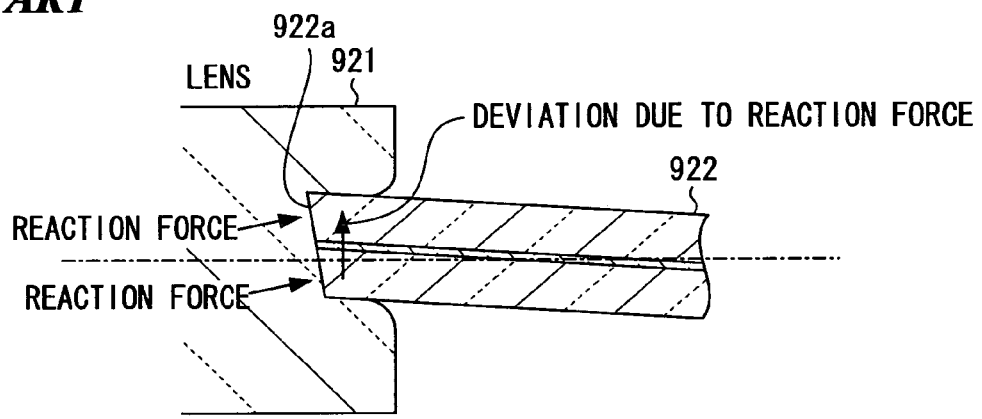

By the way, at step S3 in FIG. 3, when an obliquely-cut optical fiber is pushed into a lens heated and softened, there may be the case where the core of the front end (incident end) misaligns from the optical axis because the inclined end surface of the optical fiber receives a reaction force in the direction perpendicular to the surface from the glass (see FIG. 20B). However, in the present embodiment, the obliquely-cut optical fiber is pulled back from the lens in subsequent step S4, and therefore, it is possible to return the position of the core to the optical axis during the pulling-back.

In addition, by obliquely cutting the front end of the optical fiber, the front end of the optical fiber (the outer circumference of the optical fiber) protrudes ahead (toward the lens side) from the incident end of the core, and therefore, it is necessary to use a lens designed such that the spatial focus position is more distant apart from the rear end surface compared to the case where a perpendicularly-cut optical fiber is used.

Further, in the first embodiment of the present invention, thermal plasma is generated by arc discharges in order to partially fuse the lens, however, other various heaters may also be used. For example, a combination of a laser beam source and a convergent optical system, or a micro torch flame may also be used.

As a general laser beam source for heating, a $CO_2$ laser or a YAG laser is used, however, it is preferable to match the wavelength of the laser to the absorption wavelength of the glass member forming the lens. In addition, a convergent optical system is used for converging laser beams emitted from the laser beam source to the vicinity of the center portion of the rear end surface of the lens. Here, a convergent optical system is normally arranged such that a laser beam enters the direction oblique with respect to the rear end surface of the lens. However, when the convergent optical system is arranged in such a way, if the optical fiber is pushed into the lens, a shadow is produced by the optical fiber and there may be a possibility that the side beyond the shadow is not heated. Therefore, it is preferable to irradiate the rear end surface of the lens evenly from plural angles by providing a plurality of convergent optical systems.

Next, an optical device fabrication apparatus according to a second embodiment of the present invention will be described with reference to FIG. 8. The optical device fabrication apparatus shown in FIG. 8 is an apparatus for fabricating a multi-core fiber collimator in which a plurality of optical fibers are connected to one lens. In the present embodiment, the case where a two-core fiber collimator is fabricated will be described.

Instead of the fiber holder 113 and the reflected light detection section 130 shown in FIG. 1, a fiber holder 213 and a reflected light detection section 230 are provided, respectively. Other configurations are the same as those of the optical device fabrication apparatus shown in FIG. 1.

On the fiber holder 213, a groove such as V-groove or U-groove is formed for holding two optical fibers 22a and 22b to be connected to a lens 21 in close contact to each other or at a predetermined interval.

Figure 9:
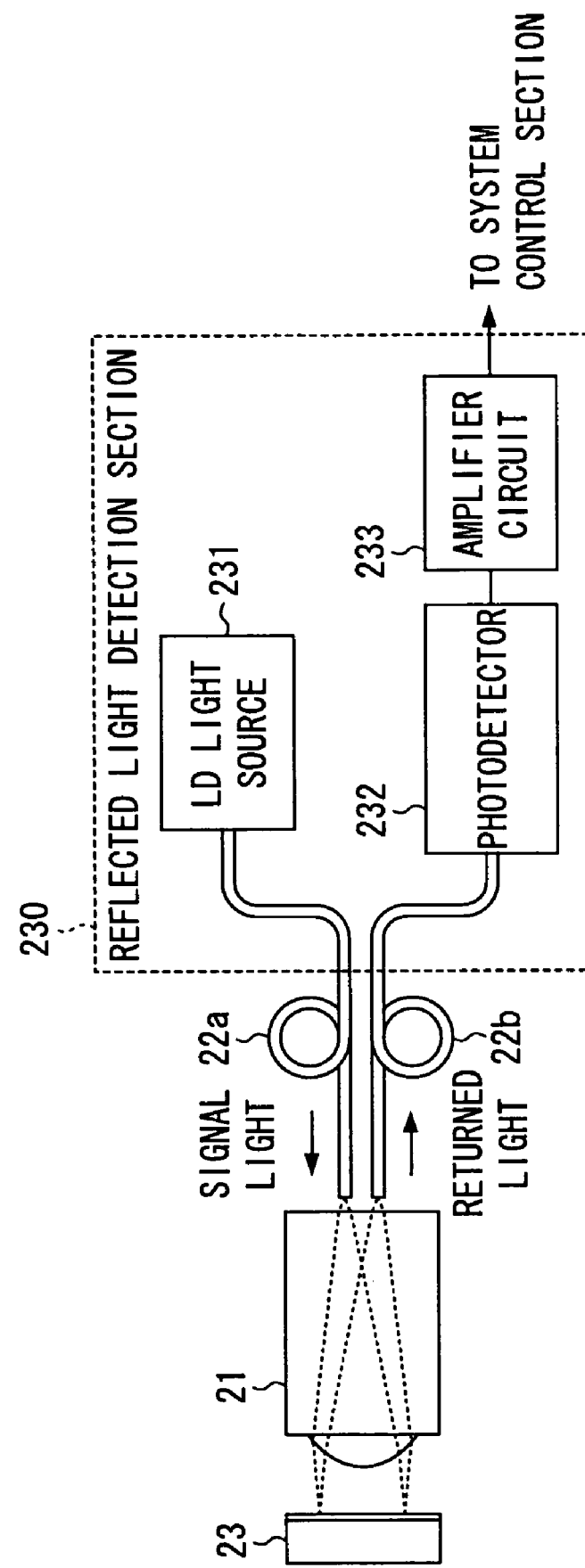
FIG. 9 is a diagram for explanation of a configuration of the reflected light detection section shown in FIG. 8.

FIG. 9 is a diagram for describing a configuration of the reflected light detection section 230 shown in FIG. 8.

The reflected light detection section 230 includes a laser diode (LD) light source 231, a photodetector 232 and an amplifier circuit 233. Light (signal light) emitted from the LD light source 231 passes through the optical fiber 22a on the outgoing side and enters the lens 21. This light is collimated and emitted from the lens 21, reflected by a highly reflective mirror 23, returned to the lens 21 again, and converged to enter the optical fiber 22b on the incident side. Further, the returned light passes through the optical fiber 22b and enters the photodetector 232. The photodetector 232 detects the intensity of the returned light, and the detection signal output from the photodetector 232 is amplified in the amplifier circuit 233 and output to the system control section 100 (FIG. 8).

Figure 10A:
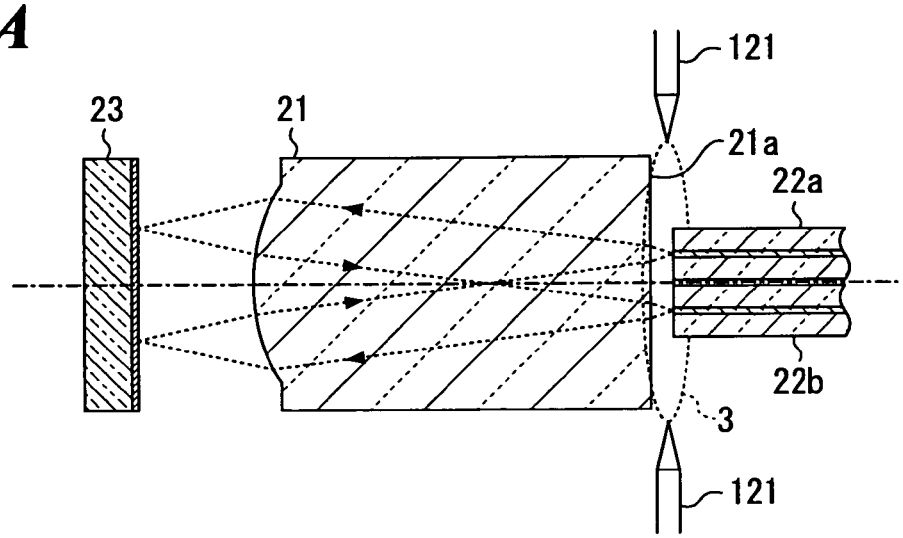
FIGS. 10A and 10B are diagrams for explanation of an operation of the optical device fabrication apparatus shown in FIG. 8.
Figure 10B:
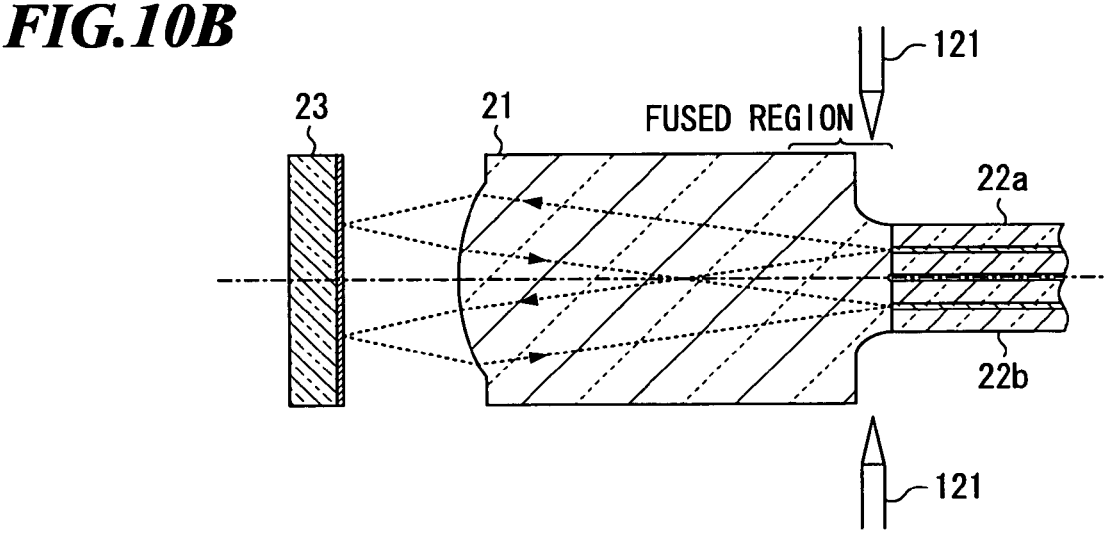

Next, an optical device fabrication method according to the second embodiment of the present invention will be described with reference to FIGS. 3, 8, 10A and 10B. FIGS. 10A and 10B are diagrams for explanation of the operation of the optical device fabrication apparatus shown in FIG. 8.

First, as a preparation before the operation of the optical device fabrication apparatus, the lens 21 is set to the lens holder 111 and at the same time, the two optical fibers 22a and 22b with their front end portions aligned are set to the fiber holder 213 as shown in FIG. 8, and a coarse alignment of the distance between the lens 21 and the optical fibers 22a and 22b is performed.

Next, at step S1 in FIG. 3, as described above with reference to FIG. 9, signal light is caused to enter the optical fiber 22a, and optical axis alignment is performed by scanning the movable stage 114 three-dimensionally while monitoring the returned light outgoing from the optical fiber 22b.

Next, at step S2, as shown in FIG. 10A, by generating the discharge plasma 3 by arc discharges, the rear end surface 21a of the lens 21 is heated and softened and at the same time, the front end portions of the two optical fibers 22a and 22b are heated.

At step S3, the front end portions of the two optical fibers 22a and 22b are pushed into the rear end surface 21a of the lens 21 to a predetermined depth, and at step S4, the two optical fibers 22a and 22b are finally pulled back to the optical focus position of the lens 21. Due to this, as shown in FIG. 10B, the softened glass member of the lens is pulled out to the outside of the rear end surface 21a of the lens 21 along with the optical fibers 22a and 22b. Further, at step S5, the arc discharge is terminated and the lens 21 and the optical fibers 22a and 22b are allowed to cool down spontaneously. Due to this, the lens 21 and the optical fibers 22a and 22b are fixed and a two-core fiber collimator is completed.

Incidentally, the calculation method of the amount of pushing-in of the optical fiber at step S3 and the amount of pulling-back of the optical fiber at step S4, or the method for determining the position of the optical fiber after pulling-back is the same as that described in the first embodiment of the present invention.

Figure 11:
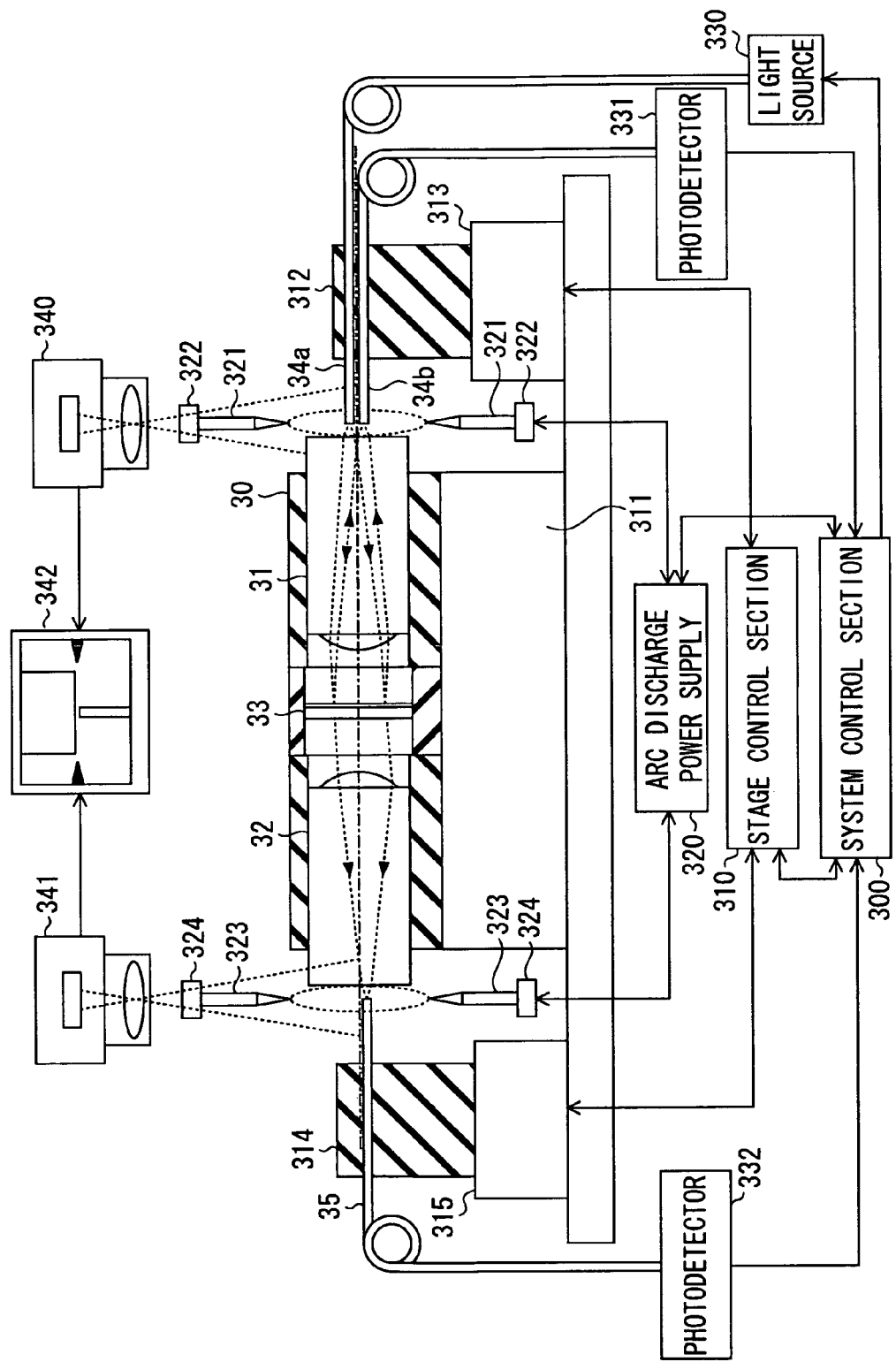
FIG. 11 is a schematic diagram showing a configuration of an optical device fabrication apparatus according to a third embodiment of the present invention.

Next, an optical device fabrication apparatus according to a third embodiment of the present invention will be described with reference to FIG. 11. The optical device fabrication apparatus shown in FIG. 11 is an apparatus for fabricating a facing module in which optical devices such as a translucent mirror or a wavelength selection mirror is arranged between two fiber collimators facing to each other. Such a facing module has functions of branching light, coupling light, dividing wavelength (WDW), etc. In the present embodiment, a facing module is fabricated, in which for light emitted from a light source and including two wavelength components of 1.3 μm and 1.55 μm, the wavelength component of 1.3 μm is reflected while the wavelength component of 1.55 μm is allowed to transmit by a wavelength selection mirror (a wavelength filter).

The optical device fabrication apparatus shown in FIG. 11 includes a system control section 300, a stage control section 310, an arc discharge power supply 320, a holder 311, a fiber holder 312 and a movable stage 313 (on the right-hand side in the drawing), a fiber holder 314 and a movable stage 315 (on the left-hand side in the drawing), an arc electrode 321 and an arc electrode holder 322 (on the right-hand side in the drawing), an arc electrode 323 and an arc electrode holder 324 (on the left-hand side in the drawing), a light source 330, and photodetectors 331 and 332. In addition, the optical device fabrication apparatus according to the present embodiment may further include position observation sections 340 and 341 and a monitor 342.

The system control section 300 controls entire operations of the optical device fabrication apparatus shown in FIG. 11, that is, a series of fusing and splicing procedures for fabricating the optical device.

The holder 311 is a jig for holding blocks 30 formed of plural V-groove parts for holding lenses 31 and 32 to be processed and a wavelength filter 33 respectively. Otherwise, the blocks 30 may also be formed of cylindrical parts or U-shaped parts.

Here, it is preferable that the blocks 30 of V-groove parts be formed of an insulating material so as not to disturb arc discharges. Additionally, it is necessary to devise the shape of the blocks 30 of V-groove parts by adjusting the length of the V-groove or providing the blocks 30 of V-groove parts with a hole or a notch for inserting an arc electrode such that the blocks 30 of V-groove parts do not disturb arrangement of the arc electrodes 321 and 323.

The fiber holder 312 holds two optical fibers 34a and 34b to be connected to the lens 31. The fiber holder 314 holds an optical fiber 35 to be connected to the lens 32. The movable stages 313 and 315 move the fiber holders 312 and 314, respectively, under the control of the stage control section 310.

Each of the respective arc electrodes 321 and 323 is formed of pairs of plus and minus electrodes and causes an arc discharge to occur by being supplied with power from the arc discharge power supply 320 that operates under the control of the system control section 300. The arc electrode holders 322 and 324 are jigs for fixing the arc electrodes 321 and 323, respectively.

The light source 330 emits signal light used for performing optical axis alignment between plural devices and causes the signal light to propagate through the optical fiber 34a. The photodetector 331 detects the intensity of the returned light propagated through the optical fiber 34b. Further, the photodetector 332 detects the intensity of the light propagated through the optical fiber 35. The detection signals output from the photodetectors 331 and 332 are inputted to the system control section 300.

The position observation section 340 is an image pick-up device for observing the splicing portion of the lens 31 and the optical fibers 34a and 34b. Moreover, the position observation section 341 is an image pick-up device for observing the splicing portion of the lens 32 and the optical fiber 35. Furthermore, the monitor 342 displays images picked up by the position observation sections 341 and 342.

Next, an optical device fabrication method according to the present embodiment will be described with reference to FIG. 12. FIG. 12 is a flow chart showing the operation of the optical device fabrication apparatus shown in FIG. 11.

First, as a preparation before the operation of the optical device fabrication apparatus, the lenses 31 and 32 held by the V-groove parts and the wavelength filter 33 are prepared, and the blocks 30 of V-groove parts are fabricated by aligning the lenses 31 and 32 and the wavelength filter 33 on the V-groove parts and fixing them by bonding and welding. Then, the blocks 30 of V-groove parts are set on the holder 311. Further, the optical fibers 34a and 34b are arranged on the fiber holder 312, and the optical fiber 35 is arranged on the fiber holder 314.

Next, at step S11 in FIG. 12, optical axis alignment of the optical device on the right-hand side is performed. That is, signal light emitted from the light source 330 is caused to enter the wavelength filter 33 through the optical fiber 34a and the lens 31. As a result, light having a wavelength component of 1.3 μm included in the signal light is reflected by the wavelength filter. The reflected light returns to the optical fiber 34b through the lens 31. Accordingly, the intensity of the returned light is detected by the photodetector 331. Then, by scanning the movable stage three-dimensionally while monitoring the intensity of the returned light, the position of the optical fibers 34a and 34b at which the intensity of the detection signal of the returned light is strongest is searched.

Next, at step S12, the lens 31 and the optical fibers 34a and 34b, for which optical axis alignment has been performed at step S11, are fused and spliced to each other. This fused-splicing is performed in the same manner as that described in the second embodiment of the present invention, that is, by pushing the front end portions of the optical fibers 34a and 34b into the rear end surface of the lens 31 softened by arc discharge heating to a predetermined depth and then by finally pulling back the optical fibers 34a and 34b to the optical focus position of the lens 31 to allow them to cool down spontaneously.

Next, at step S13, optical axis alignment of the optical device on the left-hand side is performed. Here, among light emitted from the light source 330, light having a wavelength component of 1.55 μm passes through the wavelength filter 32 and is converged by the lens 32 in the direction of the optical fiber 35. Then, by scanning the movable stage 315 three-dimensionally while monitoring the intensity of the converged light by the photodetector 332, the position of the optical fiber 35 at which the intensity of the detection signal of the converged light is strongest is searched.

Next, at step S14, the lens 32 and the optical fiber 35, for which optical axis alignment has been performed at step S13, are fused and spliced to each other. This fused-splicing is performed in the same manner as that described in the first embodiment of the present invention, that is, by pushing the front end portion of the optical fiber 35 into the rear end surface of the lens 32 softened by arc discharge heating to a predetermined depth and then, by finally pulling back the optical fiber 35 to the optical focus position of the lens 32 to allow them to cool down spontaneously. Thus, the facing module is completed.

Also in the third embodiment of the present invention described above, as in the first embodiment of the present invention, as a heater for heating the rear end surface of the lens, a combination of a laser beam source and a convergent optical system, micro torch flames, etc., can also be used.

Next, an optical device fabrication method according to a fourth embodiment of the present invention will be described. In the present embodiment, a fiber collimator having a comparatively large aperture is fabricated.

Figure 13A:
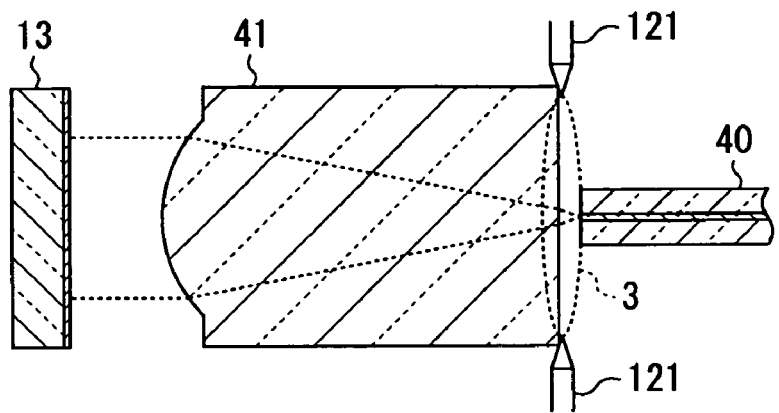
FIGS. 13A-13C are diagrams for explanation of an optical device fabrication method according to a fourth embodiment of the present invention.

Here, in the case where a fiber collimator having a large aperture is fabricated, it is difficult to soften the end surface of a lens by the same arc discharge scheme as that in the first to third embodiments of the present invention. For example, as shown in FIG. 13A, since the diameter of a lens 41 to which an optical fiber 40 is spliced becomes large, a problem of arrangement arises such as that the arc electrode 121 comes into contact with the end portion of the lens 41, etc. If the lens 41 is placed more distant apart from the arc electrode 121 in an attempt to avoid such a contact, the region heated by discharge plasma becomes narrower. Accordingly, it is not possible to sufficiently fuse the region into which the optical fiber 40 is inserted. Alternatively, it can be considered that the arc electrodes 121 are arranged more distant apart from each other, however, in this case, it is necessary to increase the intensity of the arc discharge and because of this, the region of the lens 41 more than necessary is fused as a result, and therefore, it is not practical. In the present embodiment, the following two methods are used in order to solve such a problem.

Figure 13B:
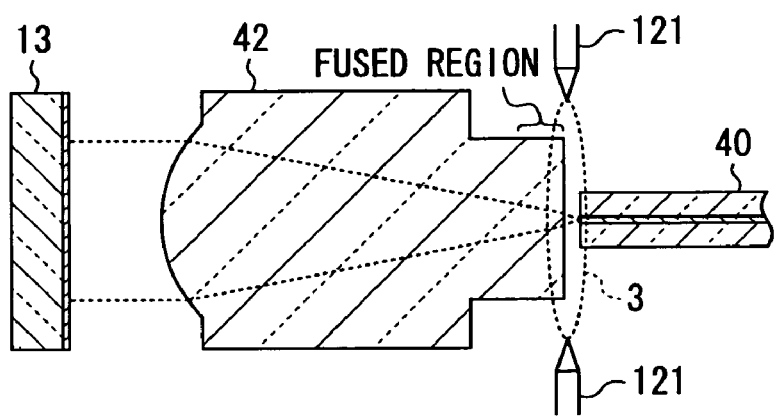
Figure 13C:
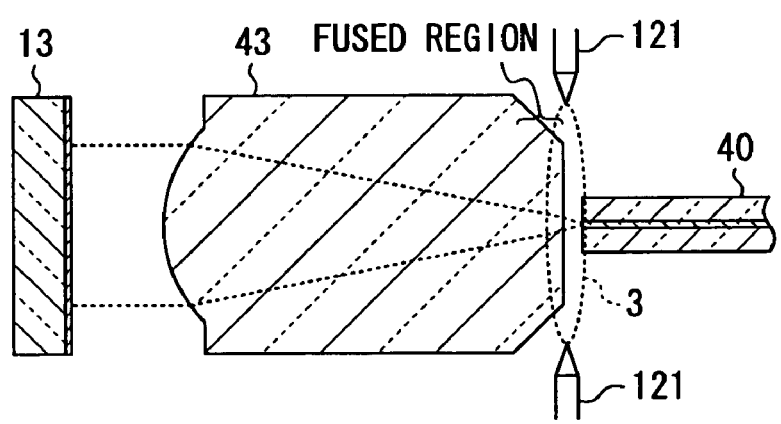

(1) Method of making small the rear end surface of a collimator lens having a large aperture The area of the end surface, to which the optical fiber 40 is spliced, is reduced by providing the rear portion of a lens 42 with a difference in level as shown in FIG. 13B, or by obliquely cutting the rear portion of a lens 43 as shown in FIG.

13C. Due to this, the region to be heated (the region to be fused) can be narrowed, and it is possible to sufficiently soften the end surface by the arc discharge scheme. In this case, it is preferable that the diameters of the rear end surfaces 42*a* and 43*a* of the lenses 42 and 43 or the shortest portion of the projection length be at least 1.5 times the diameter of the optical fiber 40, or more preferably, not less than twice and less than 20 times.

Figure 14A:
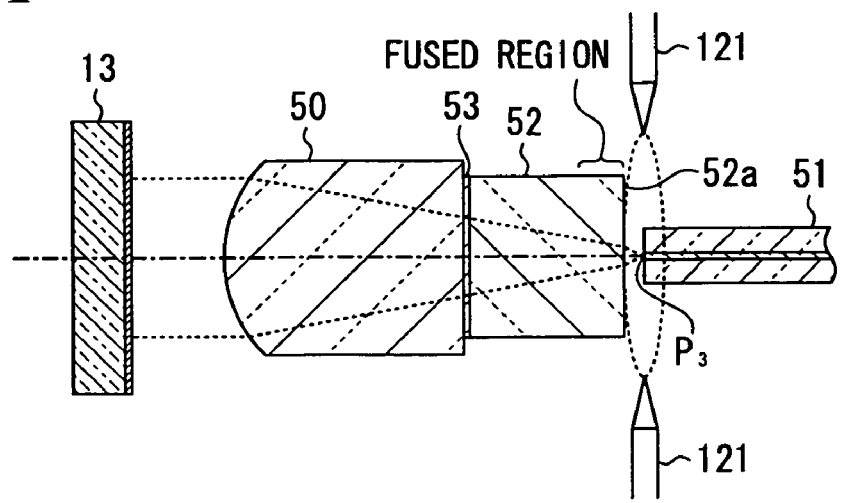
FIGS. 14A and 14B are diagrams for explanation of an optical device fabrication method according to the fourth embodiment of the present invention.
Figure 14B:
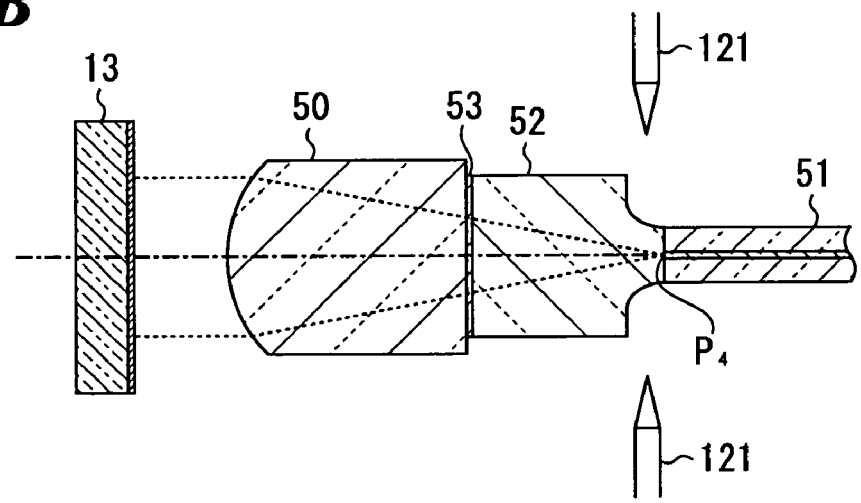

(2) Method of splicing an optical fiber to a collimator lens via a glass part formed into a cylinder or cone shape As shown in FIG. 14A, to the rear end surface of a GRIN lens (a graded refraction index lens) 50, a cylindrical or cone-shaped glass part 52 having a diameter smaller than the rear end surface of the GRIN lens 50 and formed of a low melting point glass is bonded using an adhesive 53 etc. Then, by heating a rear end surface 52*a* of the glass part 52, and pushing an optical fiber 51 into the glass part 52 and pulling it back therefrom, both are spliced to each other as shown in FIG. 14B. In this case, a spatial focus position $P_3$ of the GRIN lens 50 is formed on the back side of the rear end surface 52*a* through the adhesive 53 and the glass part 52 as shown in FIG. 14A, and the optical fiber 51 is pulled back such that the incident end is positioned at an optical focus position $P_4$ formed inside the glass part 52 as shown in FIG. 14B.

It is preferable that the shortest portion of the projection length of the rear end surface 52*a* of the glass part 52 be not less than about 1.5 times the diameter of the optical fiber 51 to be spliced, and more preferably, not less than twice and less than 20 times. The requirements for the shape of the glass part 52 are that the shape is suitable to the arc discharge, that is, the shape is capable of coming into contact with the discharge plasma 3 at a wide area without disturbing arrangement of the arc electrodes 121 and that the shape does not change considerably to such an extent that an optical distortion is produced in the glass part 52 in the step of pushing-in and pulling-back of the optical fiber. Therefore, as the glass part 52, it can be thought best to use a cylindrical shape or a truncated cone shape, however, various shapes can also be used, such as a polygonal column, an elliptic cylinder, a polygonal pyramid, and an elliptic cone, provided the above-mentioned requirements are met.

Next, modification examples of the optical device fabrication apparatus according to the first to fourth embodiments of the present invention will be described. In these embodiments, the case where the optical device is fabricated one by one is described, however, it is also possible to fabricate plural optical devices continuously or simultaneously by partially exchanging the parts such as the lens holder and the arc electrode holder.

Figure 15:
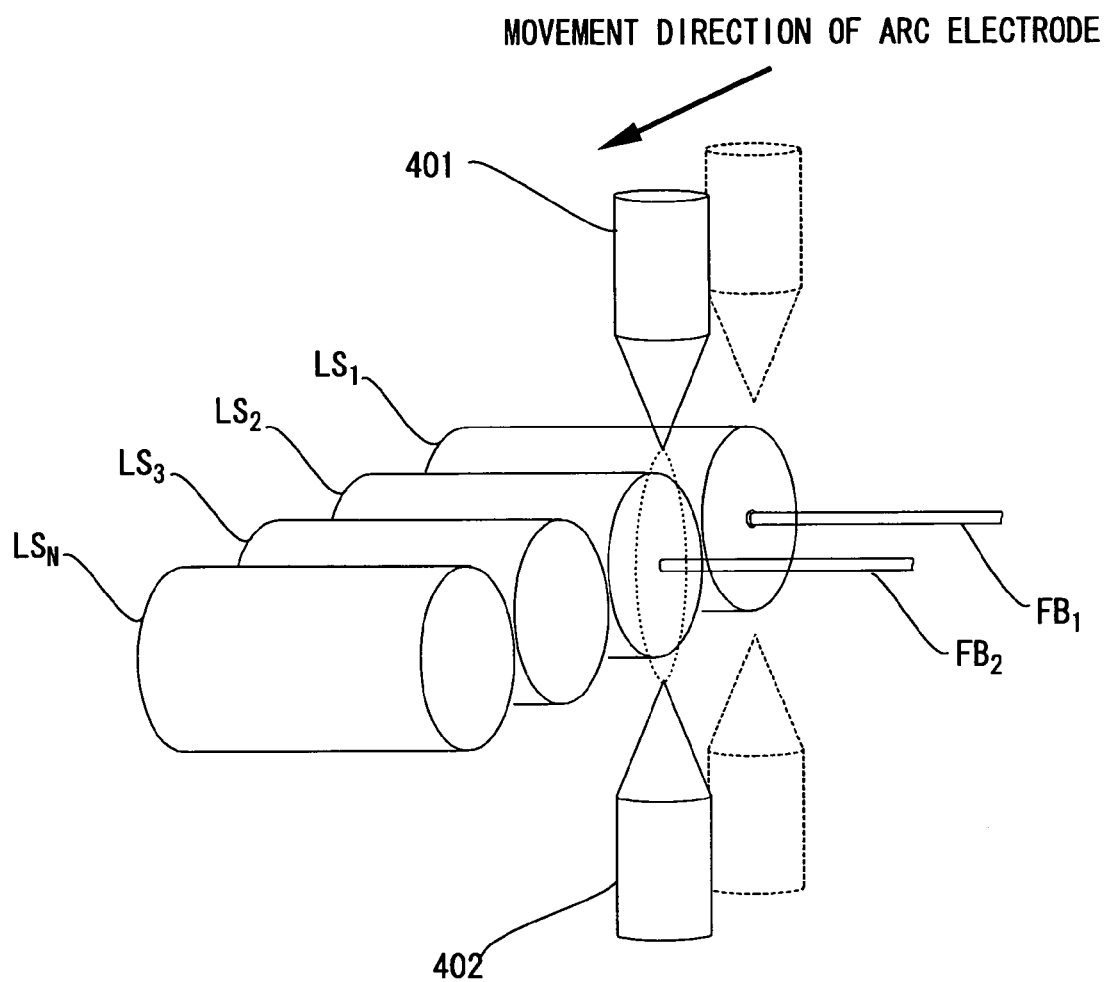
FIG. 15 is a diagram for explanation of a first modification example of the optical device fabrication apparatus according to the first to fourth embodiments of the present invention.

For example, as shown in FIG. 15, plural lenses $LS_1$, $LS_2$, . . . , $LS_N$ are arranged in alignment. Then a fusing and splicing operation including softening of the end surfaces of the lenses $LS_1$ to $LS_N$ and pushing-in and pulling-back of optical fibers $FB_1$, $FB_2$, . . . are performed sequentially by moving arc electrodes 401 and 402 in the direction of the arrow shown in the drawing while causing a plasma to occur using the arc electrodes 401 and 402. FIG. 15 shows how the fusing and splicing operation is performed for the lens $LS_2$ after fused-splicing of the optical fiber $FB_1$ to the lens $LS_1$ is completed.

According to this modification example, it is made possible to efficiently fabricate a number of optical devices.

Figure 16:
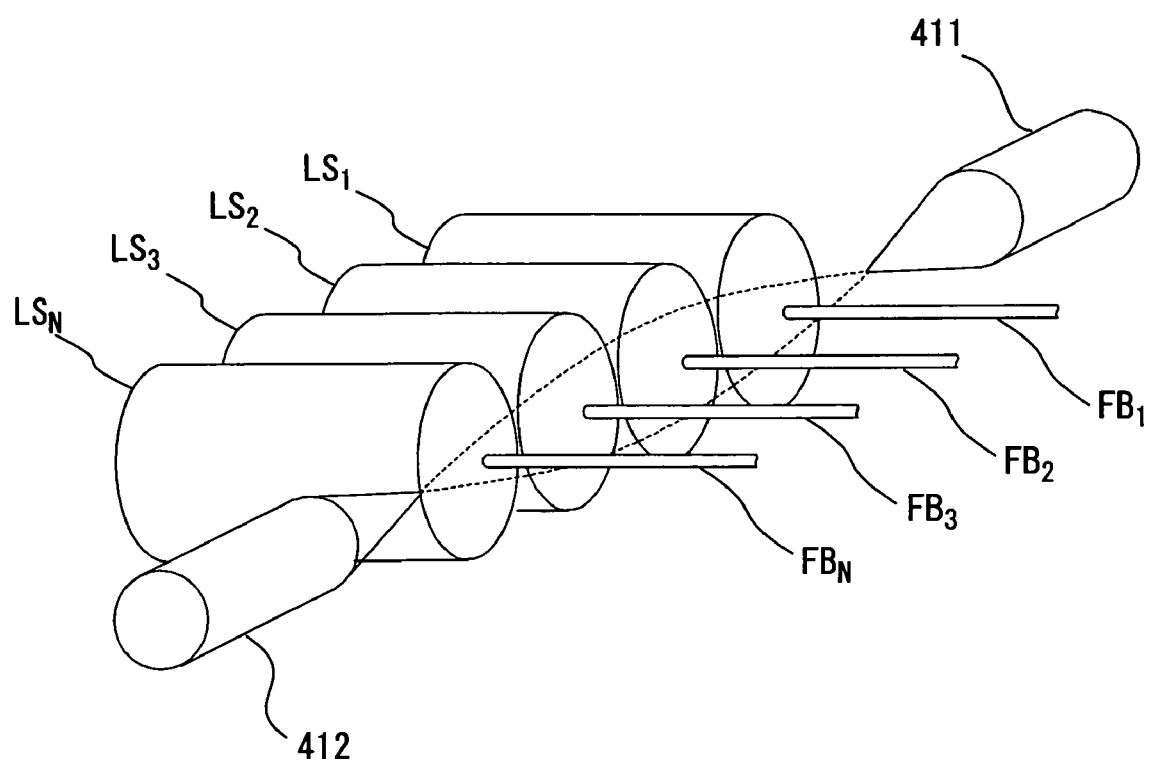
FIG. 16 is a diagram for explanation of a second modification example of the optical device fabrication apparatus according to the first to fourth embodiments of the present invention.
Figure 17A:
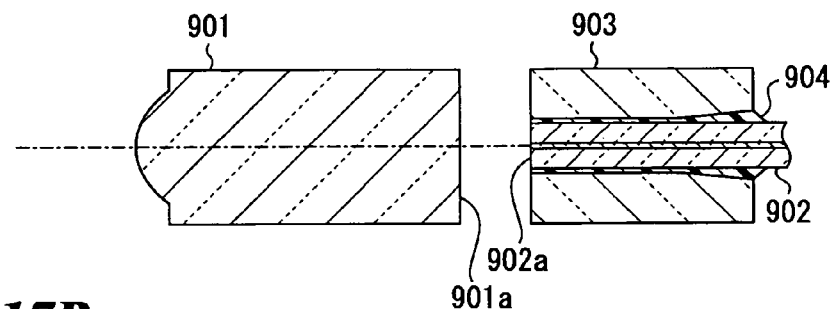
FIGS. 17A-17C are diagrams for explanation of a conventional fabrication method for fiber collimators.
Figure 17B:
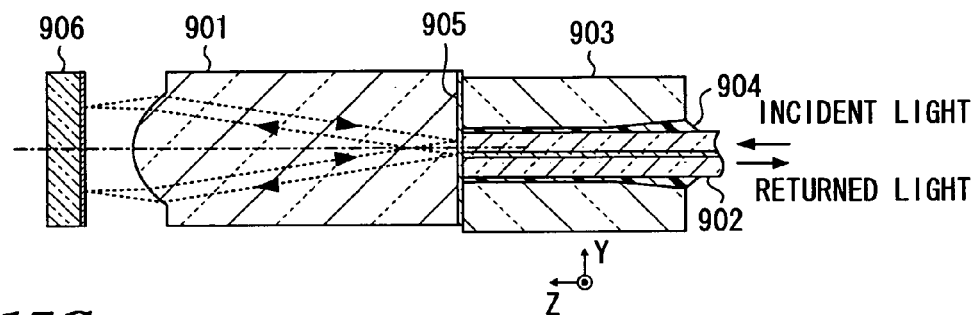
Figure 17C:
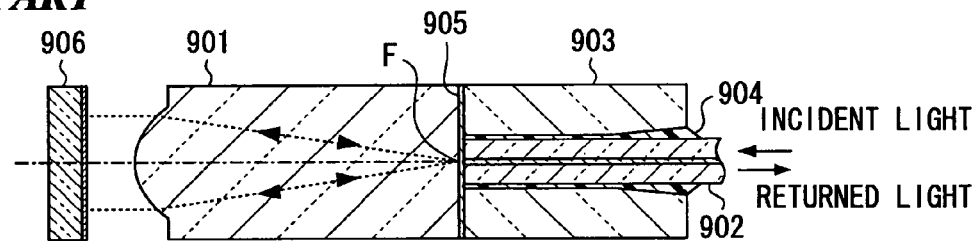
Figure 18A:
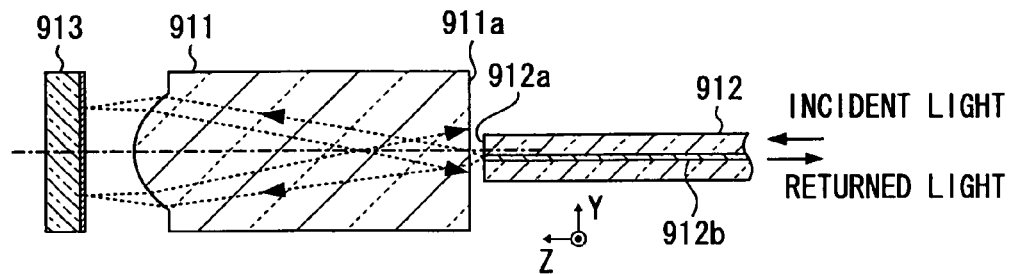
FIGS. 18A-18C are diagrams for explanation of another conventional fabrication method for fiber collimators.
Figure 18B:
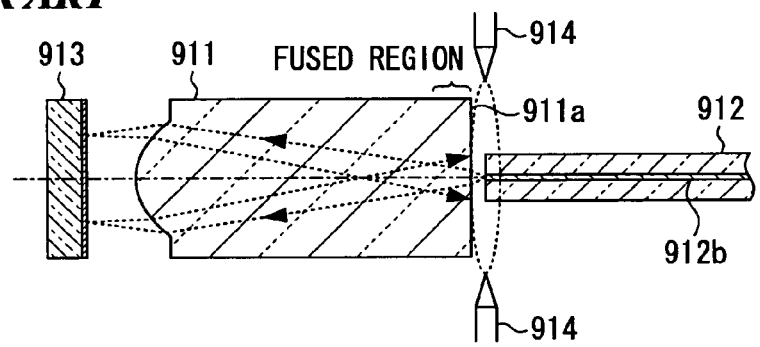
Figure 18C:
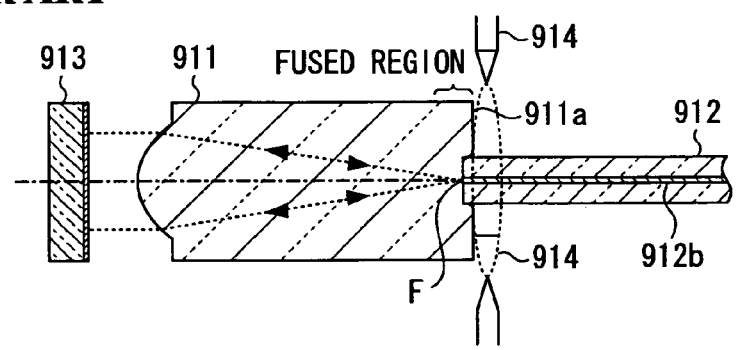
Figure 19:
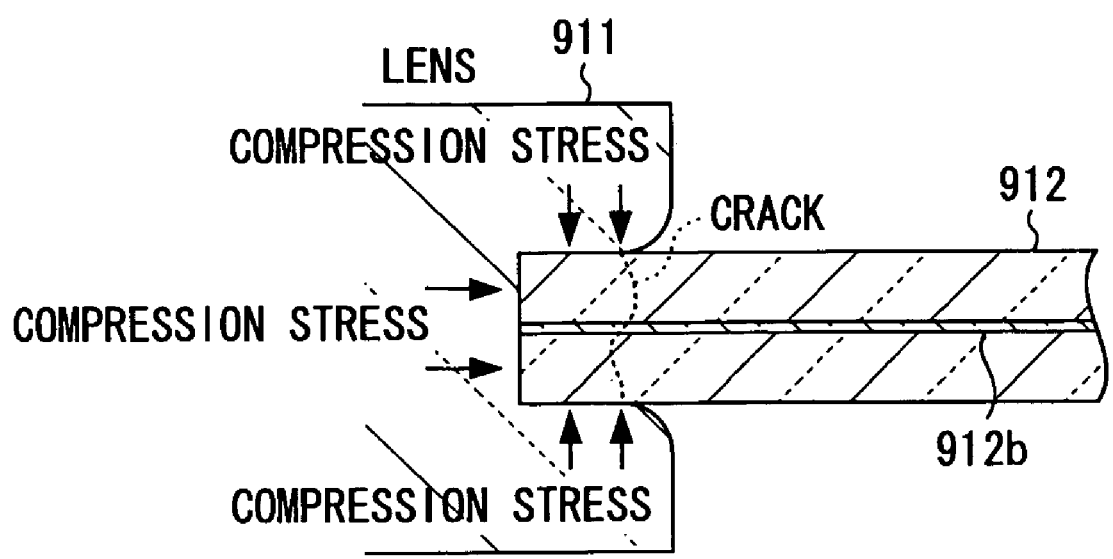
FIG. 19 is a schematic diagram showing a state in which a crack is caused to occur in an optical fiber pushed into a lens.

Alternatively, as shown in FIG. 16, the plural lenses $LS_1$, $LS_2$, . . . , $LS_N$ are arranged in alignment and arc electrodes 411 and 412 are arranged such that the plasma generated by the arc electrodes 411 and 412 covers the plural end surfaces (splicing surfaces) of the lenses $LS_1$ to $LS_N$. Then, fused-splicing is performed by causing a plasma to occur to fuse the end surfaces of the lenses $LS_1$ to $LS_N$ and by simultaneously pushing the plural optical fibers $FB_1$ to $FB_N$ arranged in alignment with the pitch of the lenses $LS_1$ to $LS_N$ and then pulling them back.

According to this modification example, it is made possible to efficiently fabricate a number of optical devices in a short time.

Further, in the case where these modification examples are applied to the optical device fabrication apparatus for the facing module as shown in FIG. 11, instead of preparing a half mirror or wavelength selection mirror (wavelength filter) 33 for each optical device, it is sufficient to prepare one large-sized filter for plural optical devices. In other words, a filter is arranged continuously among plural sets of lenses and the filter is cut after splicing the optical fibers to the lenses. In this case, there are advantages that the efficiency of fabrication of optical devices can be improved, and the fabrication cost can be reduced because the number of filters can be reduced.

Additionally, in these modification examples, when plural lenses and optical devices are arranged in the optical device fabrication apparatus, it is suggested to use, for example, a lens holder on which plural V-grooves or U-grooves are formed.

In the first to fourth embodiments of the present invention described above, the optical devices formed of materials having different melting points (for example, the lens 11 of low melting point glass and the optical fiber of high melting point glass or quartz) are used as objects to be processed. However, it is not necessarily required to use materials having different melting points if fused-splicing of the optical devices is possible. That is, optical devices may also be fabricated by combining a quartz lens and a quartz fiber, a lens and a fiber both of high melting point glass, or a lens and a fiber both of low melting point glass.

According to the above-mentioned first to fourth embodiments of the present invention, it is possible to avoid problems in the conventional fabrication methods for optical devices.

That is, firstly, in the above-mentioned embodiments, the spliced portion of the lens and the optical fiber in the fiber collimator has substantially a shape formed by pulling out the glass member of the lens along the shape of the end surface of the optical fiber. Accordingly, it is not likely that the front end of the optical fiber enclosed by the glass is pressed by the contraction of the glass and the optical fiber receives stress distortion. As a result, damages of the optical fiber can be prevented.

Secondly, according to the conventional method, a lens having a focus existing on the inside thereof was used as a device, and optical axis alignment was performed in a state in which the center of the intensity peak was broadened, that is, based on the returned light in a blurred state. Because of this, it was only possible to estimate the center of the optical axis on the X-Y plane. Further, as for the Z-axis, it was impossible to confirm the focus position before fused-splicing. On the other hand, according to the present invention, by using a lens having a focus existing on the outside thereof, it is made possible to initiate a fused-splicing process after confirming the image forming position on the X-axis, Y-axis, and Z-axis and performing an accurate optical axis alignment.

Thirdly, by using a lens having a focus existing on the outside thereof, it is made possible to actually measure the distance between the spatial focus position of the lens and the rear end surface of the lens by using an image measuring technique, etc. Due to this, the amount of pulling-out of the optical fiber in the fused-splicing process can be calculated based not only on the designed values but also on the actually measured values. As a result, it is made possible to fabricate optical devices with high precision capable of coping with variations of respective lenses.

Fourthly, in the case where an obliquely-cut optical fiber is used, the core of the front end of the optical fiber is apt to misalign from the optical axis due to the reaction force received by the inclined end surface of the optical fiber from the glass at a step of pushing the optical fiber into the softened glass member. According to the conventional fused-splicing method, the optical fiber and the lens were allowed to cool down spontaneously in a state in which the optical fiber was pushed into the lens. As a result, they were fixed in an arrangement in which the core of the front end is misaligned from the optical axis. On the other hand, according to the present invention, after the optical fiber is once pushed into the lens, the optical fiber is pulled back in the opposite direction, and therefore, the misaligned arrangement of the core with respect to the optical axis of the optical fiber is recovered to the original arrangement. Consequently, it is made possible to fabricate optical devices with high reliability.

Further, in the above-mentioned first to fourth embodiments, there is described the case where a fiber collimator, in which a lens and an optical fiber are spliced to each other, is fabricated, however, the present invention can be further applied to cases where various optical devices are fabricated. As examples, there are the case where a wave decoupler, in which a prism and an optical fiber is spliced to each other, is fabricated and the case where a buffer layer of glass, etc. is spliced to the end surface of an optical fiber in order to prevent destruction of the end surface upon which laser beams are incident.

In addition, in the above-mentioned first to third embodiments of the present invention, movement of the movable stage in the pushing-in step and pulling-back step of an optical fiber is entirely performed by automatic control, however, it may also be possible for an operator to manually operate the movable stage while observing the splicing portion of the lens and the optical fiber on a monitor or while observing the intensity of the returned light from the lens.

The invention claimed is:

1. An optical device fabrication method of splicing a first optical device and at least one second optical device to fabricate a third optical device, said method comprising the steps of:
   (a) starting heating of an end surface of said first optical device to soften the end surface;
   (b) pushing said at least one second optical device into the softened end surface of said first optical device by a predetermined amount so as to splice said first optical device and a joint surface of said at least one second optical device to each other;
   (c) pulling back said at least one second optical device from the softened end surface of said first optical device to a predetermined position so as to arrange the joint surface of said at least one second optical device into or outside of the end surface of said first optical device; and
   (d) terminating heating of the end surface of said first optical device so as to fix, said first optical device and said at least one second optical device spliced to each other;
   wherein step (b) includes pushing said at least one second optical device into the end surface of said first optical device while applying vibrations to at least one of said first optical device and said at least one second optical device.

2. An optical device fabrication method of splicing a first optical device and at least one second optical device to fabricate a third optical device, said method comprising the steps of:
   (a) starting heating of an end surface of said first optical device to soften the end surface;
   (b) pushing said at least one second optical device into the softened end surface of said first optical device by a predetermined amount so as to splice said first optical device and a joint surface of said at least one second optical device to each other;
   (c) pulling back said at least one second optical device from the softened end surface of said first optical device to a predetermined position so as to arrange the joint surface of said at least one second optical device onto or outside of the end surface of said first optical device; and
   (d) terminating heating of the end surface of said first optical device so as to fix said first optical device and said at least one second optical device spliced to each other;
   wherein step (c) includes pulling back said at least one second optical device to a position beyond said predetermined position, and then, pushing said at least one second optical device back to said predetermined position.

3. An optical device fabrication method of splicing a first optical device and at least one second optical device to fabricate a third optical device, said method comprising the steps of:
   (a) performing optical axis alignment between said first optical device and said at least one second optical device;
   (b) starting heating of an end surface of said first optical device to soften the end surface;
   (c) pushing said at least one second optical device into the softened end surface of said first optical device by a predetermined amount so as to splice said first optical device and a joint surface of said at least one second optical device to each other;
   pulling back said at least one second optical device from the softened end surface of said first optical device to a predetermined position so as to arrange the joint surface of said at least one second optical device, onto or outside of the end surface of said first optical device; and
   (e) terminating heating of the end surface of said first optical device so as to fix said first optical device and said at least one second optical device spliced to each other,
   wherein:
   said first optical device includes a lens having a focus existing on an outside of said end surface;
   step (a) includes performing optical axis alignment based on the focus of said first optical device; and
   step (d) includes pulling back said at least one second optical device based on an amount calculated based on the focus of said first optical device.

4. An optical device fabrication method of splicing a first optical device and at least one second optical device to fabricate a third optical device, said first optical device including a lens having a focus existing on an outside of said end surface, said method comprising the steps of:
   (a) performing optical axis alignment between said first optical device and said at least one second optical device based on the focus of said first optical device;
   (b) starting heating of an end surface of said first optical device to soften the end surface;

(c) pushing said at least one second optical device into the softened end surface of said first optical device by a predetermined amount so as to splice said first optical device and a joint surface of said at least one second optical device to each other;

(d) pulling back said at least one second optical device to a predetermined position so as to arrange the joint surface of said at least one second optical device onto or outside of the end surface of said first optical device based on an amount calculated based on the focus of said first optical device such that the joint surface of said at least one second optical device is arranged at a position apart from the focus of said first optical device by a distance $L_1 \times \{(n_1/n_2) - 1\}$, where $L_1$ represents a distance between the end surface of said first optical device and the focus of said first optical device used at step (a), $n_1$ represents a refractive index of a member including the end surface of said first optical device, and $n_2$ represents a refractive index of air or vacuum; and (e) terminating heating of the end surface of said first optical device so as to fix said first optical device and said at least one second optical device spliced to each other.

5. An optical device fabrication method of splicing a first optical device and at least one second optical device to fabricate a third optical device, said method comprising the steps of:

(a) starting heating of an end surface of said first optical device to soften the end surface;

(b) pushing said at least one second optical device into the softened end surface of said first optical device by a predetermined amount so as to splice said first optical device and a joint surface of said at least one second optical device to each other;

(c) pulling back said at least one second optical device from the softened end surface of said first optical device to a predetermined position so as to arrange the joint surface of said at least one second optical device onto or outside of the end surface of said first optical device; and (d) terminating heating of the end surface of said first optical device so as to fix said first optical device and said at least one second optical device spliced to each other, wherein step (c) includes:

monitoring intensity of light, which is incident upon the end surface of said first optical device through said at least one second optical device and goes out of the end surface of said first optical device to be incident upon said at least one second optical device; and arranging the joint surface of said at least one second optical device at a position at which the monitored intensity of the light becomes strongest.

6. An optical device fabrication apparatus for splicing a first optical device and at least one second optical device to fabricate a third optical device, said device comprising:

first holding means for holding said first optical device;

second holding means for holding said at least one second optical device;

heating means for heating an end surface of said first optical device;

position adjusting means for mounting and carrying at least one of said first holding means and said second holding means to arrange said at least one second optical device at a predetermined position relative to said first optical device; and control means for controlling at least said position adjusting means to push said at least one second optical device into the end surface of said first optical device, which is softened by being heated by said heating means, by a predetermined amount so as to splice said first optical device and a joint surface of said at least one second optical device to each other, and then, to pull back said at least one second optical device from the end surface of said first optical device, which is softened by being heated by said heating means, to a predetermined position so as to arrange the joint surface of said at least one second optical device onto or outside of the end surface of said first optical device.

7. The optical device fabrication apparatus according to claim 6, wherein:

said end surface of said first optical device is formed of one of glass and quartz; and said at least one second optical device is formed of one of glass and quartz.

8. The optical device fabrication apparatus according to claim 7, wherein:

said end surface of said first optical device is formed of a first glass having a predetermined softening point;

said at least one second optical device is formed of one of a second glass having a higher softening point than the first glass and quartz.

9. The optical device fabrication apparatus according to claim 6, wherein said control means controls said position adjusting means to pull back said at least one second optical device to a position beyond said predetermined position, and then, to push said at least one second optical device back to the predetermined position.

10. The optical device fabrication apparatus according to claim 6, wherein said control means controls said heating means to terminate heating of the end surface of said first optical device after said at least one second optical device is arranged at the predetermined position.

11. The optical device fabrication apparatus according to claim 6, further comprising:

means for applying vibrations to at least one of said first optical device and said at least one second optical device.

12. The optical device fabrication apparatus according to claim 6, further comprising:

a light source for generating light to be incident upon the end surface of said first optical device through said at least one second optical device; and detecting means for detecting intensity of the light going out of the end surface of said first optical device and being incident upon said at least one second optical device.

13. An optical device comprising:

a first optical device having an end surface formed of one of glass and quartz; and at least one second optical device formed of one of glass and quartz, said at least one second optical device being spliced to said first optical device by being pushed into the end surface of said first optical device softened by being heated, and then, pulled back from the end surface of said first optical device softened by being heated in the direction opposition to the direction of being pushed;

wherein said first optical device includes a lens designed to have, a focus formed on an outside of said end surface in a state before said at least one second optical device is spliced.

* * * * *